(12) United States Patent
Hammond et al.

(10) Patent No.: US 6,439,961 B1
(45) Date of Patent: Aug. 27, 2002

(54) MACHINING CELL AND METHOD FOR DEBURRING THE ROOT OF A TURBINE BLADE

(75) Inventors: Robert E. Hammond, Portage; Stuart W. Quick, Kalamazoo; Neil J. Norcross, Mattawan; Charles M. Young, III, Portage; John J. Steve, Augusta, all of MI (US); Yair Raz; Darrell D. Guthrey, Sr., both of Columbus, GA (US)

(73) Assignees: Hammond Machinery Builders, Inc., Kalamazoo, MI (US); Precision Components International Incorporated, Columbus, GA (US)

( * ) Notice: Subject to any disclaimer, the term of this patent is extended or adjusted under 35 U.S.C. 154(b) by 0 days.

(21) Appl. No.: 09/497,001

(22) Filed: Feb. 2, 2000

Related U.S. Application Data

(60) Provisional application No. 60/177,509, filed on Jan. 21, 2000.

(51) Int. Cl.$^7$ ............................ B24B 51/00; B24B 19/14
(52) U.S. Cl. ............................................. 451/5; 451/70
(58) Field of Search .............................. 451/5, 6, 70, 69

(56) References Cited

U.S. PATENT DOCUMENTS 4,629,378 A * 12/1986 Parsons ...................... 409/131

* cited by examiner

Primary Examiner—Robert A. Rose
(74) Attorney, Agent, or Firm—Flynn, Thiel, Boutell & Tanis, P.C.

(57) ABSTRACT

A machining cell and process for deburring root edges of a turbine blade. The machining cell defines a work area enclosing a robot to pick up and transport a blade package between working stations within the cell. A supply conveyor transports the part to an orienter station inside the cell where the part is checked for type and proper orientation prior to being picked up by the robot and moved to a deburring station. The robot manipulates the package into engagement with an active cutting tool to remove material from the root edges. The robot then transports the package to a brushing station located within the cell. The robot moves the package so that edges of the root are subjected to the abrasive action of a rotating brush wheel. The finished part is then transported by the robot to a discharge conveyor which feeds the finished part outside of the cell.

26 Claims, 16 Drawing Sheets

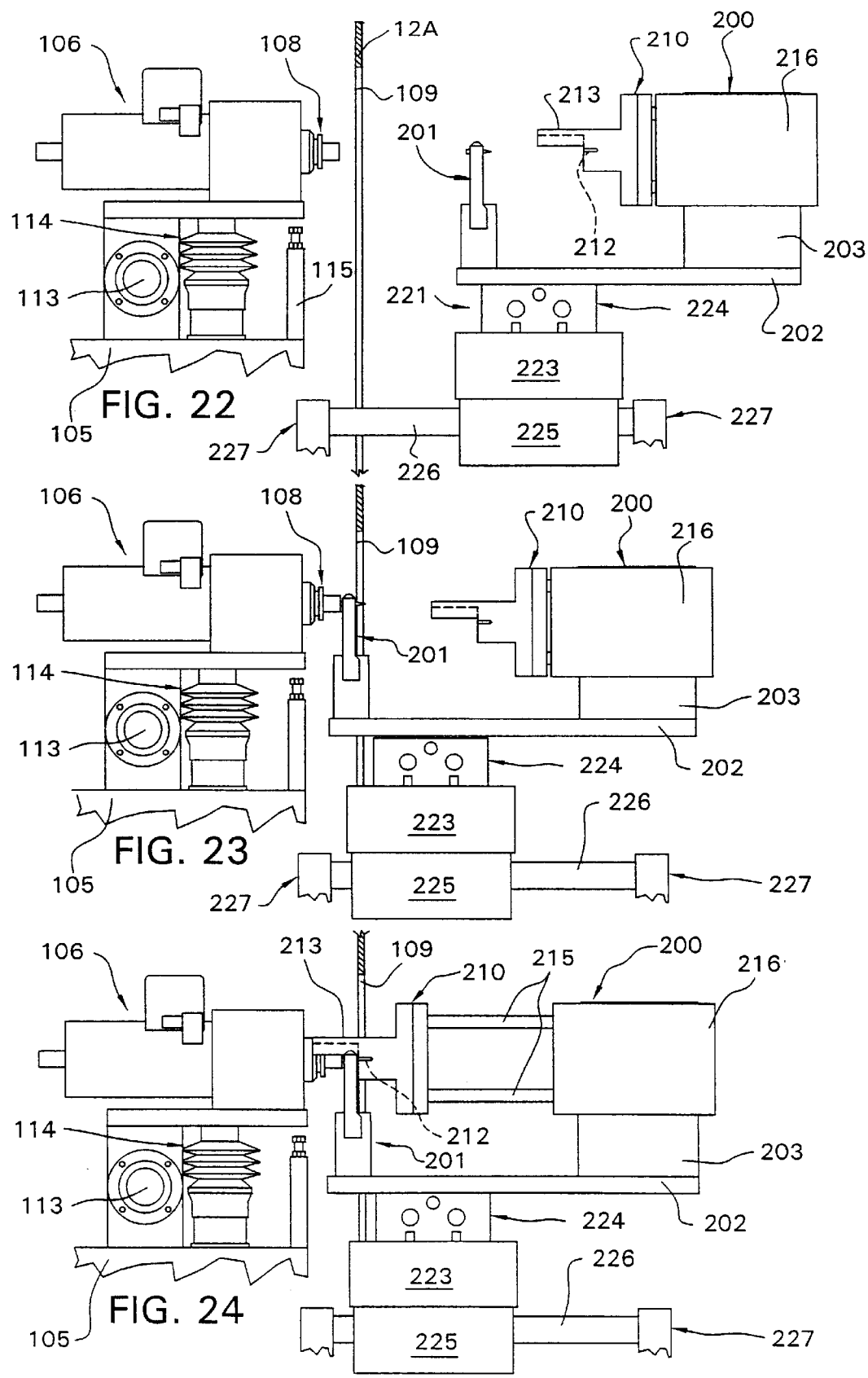

MACHINING CELL AND METHOD FOR DEBURRING THE ROOT OF A TURBINE BLADE

CROSS-REFERENCE TO RELATED APPLICATION

This Application is based upon Provisional Application Ser. No. 60/177,509 filed on Jan. 21, 2000, entitled, "MACHINING CELL AND METHOD FOR DEBURRING THE ROOT OF A TURBINE BLADE". The disclosure of this prior application is incorporated by reference in its entirety herein.

FIELD OF THE INVENTION

This invention relates to an automated apparatus and method for processing a part, such as the root of a turbine blade.

BACKGROUND OF THE INVENTION

The conventional turbine blade has a main blade body which is typically encased within a rectangular block of lead so that only the root projects outwardly thereof for subsequent processing. This root, which typically has a dove-tail shaped cross section, is at present machined in a manner which results in a plurality of sharp corners or edges where the side surfaces of the root meet the end surface. The blade or part is sent to a first working station where an operator manually applies a tool to each of the edges of the root to remove excess material and create a chamfer. The chamfered part is then sent to a buffing station typically including a number of separate buffing wheels, and the blade is then progressively advanced from one wheel to another to effectively round off all corners along the respective chamfered edges. The overall operation as briefly described above requires significant manual control and supervision, and in particular is not adapted for fully automated handling. Further, the machinery is bulky, complex and requires a large amount of floor space.

It is an object of this invention to provide a relatively compact machining or finishing cell for deburring and/or chamfering the root edges of a turbine blade, which can be positioned on a floor with a small footprint, and which can be wholly automated so as to effectively permit essentially automatic 24-hour operation without any significant manual control or supervision, other than for certain checking and replenishment functions.

Generally, the machining cell according to the invention is an enclosed structure and defines therein an enclosed work area within which a robot is disposed and functions to pick up and transport a part, such as a blade package, between various working stations also located within the cell. More specifically, the part is fed into the cell by a supply conveyor which transports the part to a part orienter station located inside the cell where the part is checked for type and proper orientation prior to being picked up or grasped by the robot. If the wrong part has been loaded onto the supply conveyor, or if the part is improperly oriented for processing, then the part is rejected, and a new part is moved into the part orienter station. If the part is the correct part and is properly oriented, as determined by the part orienter station, then the robot picks up the part and transports same to a deburring or cutting station.

The deburring station includes a turret which supports thereon a pair of diametrically opposed tool heads, each including a hard, drill-like cutting tool or burr rotated by a motor. The turret is rotatable to effectively position one tool head in an active cutting position and the opposite head in an inactive position. The robot transports the part and manipulates same along a predefined path to bring the part into engagement with the active cutting tool to remove excess material from the root of the blade package or part. The tool heads are mounted on the turret so that the respective tools thereof are movable or float. As such, the robot need not be taught or programmed to move the part along an exact path for proper processing, since the floating tool is biased in a manner so that same will follow the root profile and maintain engagement therewith.

The deburring station cooperates with a tool supply and replacement device which serves to remove broken or worn tools from the inactive tool head and replace same with new tools stored in a supply cartridge. Prior to positioning the part for engagement with the active tool as discussed above, a sensor arrangement provided adjacent the active tool senses for a broken, bent or improperly oriented tool, and if the tool is unsatisfactory in any of these respects, then further advancement of the robot is stopped, the active tool head is rotated into an inactive position (which rotates the inactive tool head into the active position for processing of the part) and the defective or improperly positioned tool is removed and replaced by the tool supply and replacement device. The condition of the active tool is also checked subsequent to processing a part, and if the tool is in an unsatisfactory condition, then same is replaced and the part just processed with the broken or improperly oriented tool is rejected.

After processing of the part at the deburring station, the robot then transports the part to a brushing or polishing station for finishing. The brushing station is also located within the cell and includes one or more brushing wheels defined by filaments containing an abrasive material. The robot moves the part so that all edges of the root are appropriately subjected to the abrasive action of the wheel for a predetermined time to finish or round the edges thereof. The brushing station incorporates a wear compensation mechanism which operates to maintain a substantially constant contact point and a substantially constant contact velocity between the part and the brushing wheel as same wears and decreases in radius. The finished part is then transported by the robot to a discharge conveyor which feeds the finished part outside of the cell.

The functioning of the various stations within the cell, including the robot and conveyors, is controlled via a logic type controller and by software which enables a substantially entirely automated operation. A control unit including a touch-sensitive video screen is also provided outside the cell for providing operator control and for monitoring of the system. This control unit is swingably mounted for movement to various locations around the cell for convenience in use.

Other objects and purposes of the invention will be apparent to persons familiar with structures of this general type upon reading the following specification and inspecting the accompanying drawings.

BRIEF DESCRIPTION OF THE DRAWINGS

FIG. 22 is a view similar to FIGS. 14–16, but illustrating the tool gripper in the retracted position after tool pick-up at the tool wheel;

FIG. 23 is a view similar to FIG. 22, but illustrating the tool gripper and gauge in the forwardly extended position for tool insertion;

FIG. 24 is a view similar to FIG. 22, but illustrating the gauge head in the extended position for setting the depth of the tool;

Figure 1:
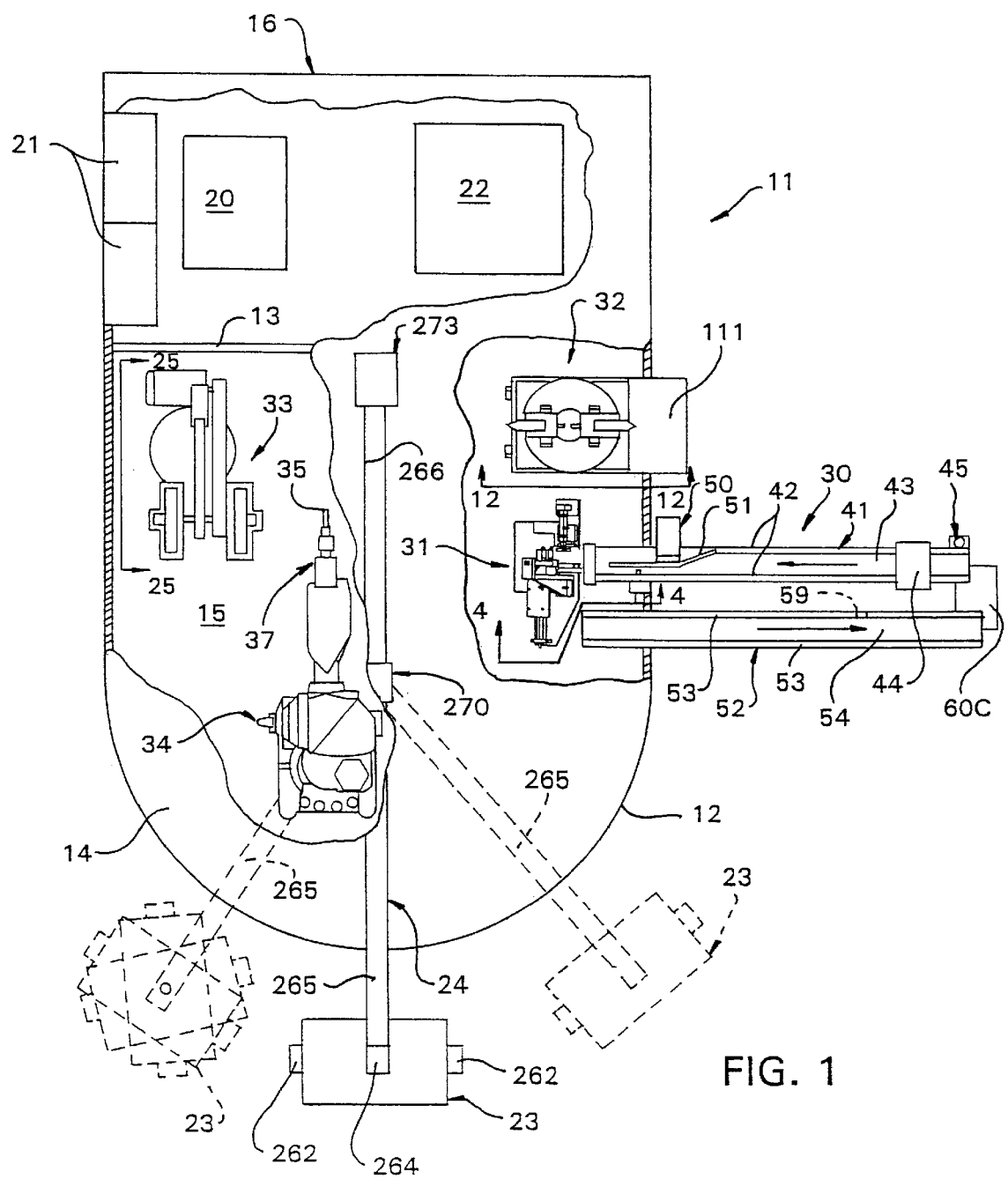
FIG. 1 is a fragmentary, schematic plan view of the machining cell according to the invention.

Certain terminology will be used in the following description for convenience in reference only, and will not be limiting. For example, the words "upwardly", "downwardly", "rightwardly", and "leftwardly" will refer to directions in the drawings to which reference is made.

The words "inwardly" and "outwardly" will refer to directions toward and away from, respectively, the geometric center of the machining cell and designated parts thereof. Said terminology will include the words specifically mentioned, derivatives thereof, and words of similar import.

DESCRIPTION OF THE PREFERRED EMBODIMENT

Referring to the drawings, and specifically FIG. 1, there is illustrated an enclosed machining cell 11 according to the invention. The cell 11 in the illustrated embodiment includes a generally vertically oriented and generally arcuate frontwardly oriented side wall 12, a rear vertically oriented and planar side wall 13 and a top wall 14 which together define an enclosed interior work area 15. The cell 11 also includes rear housing 16 which contains therein various control components such as robot controls 20, electrical control panels 21 and a dust collector 22 (all of which are shown schematically in FIG. 1). At least the side wall 12 may include one or more transparent panels (not shown) to allow visual observation of the activity within the interior work area 15. These panels may also be mounted for sliding or swinging movement relative to side wall 12, and may also be removable to allow access to various components located within cell 11. A control unit 23 is mounted on top wall 14 via an arm assembly 24 which permits swinging movement of control unit 23 along side wall 12 for convenience in use as discussed further below. Control unit 23 includes an interactive operator display panel for displaying various operational conditions and allowing operator input and control.

Figure 1A:
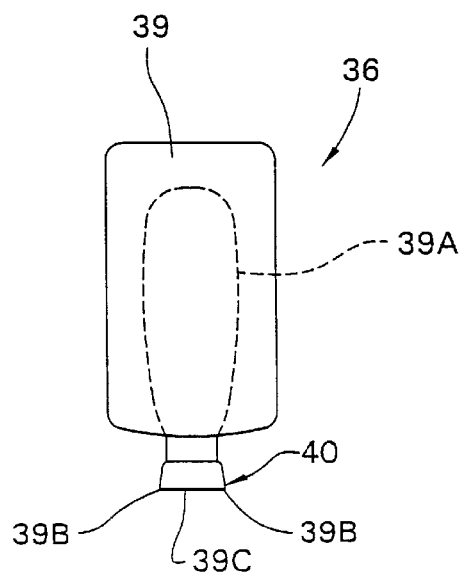
FIG. 1A is an enlarged view of the part or workpiece.

Generally, the machining cell 11 according to the invention includes an infeed-outfeed conveyor station 30, a part orienter station 31, a deburring or cutting station 32, a brushing station 33, and a robot 34 having an articulated six-axis arm 37 which mounts a clamp 35 at a free end thereof. The clamp 35 has a pair of jaws 38 which are movable relative to one another. The robot arm 37, via clamp 35, serves to transfer a part or workpiece 36 for processing from station to station. With reference to FIG. 1A, the part 36 in the illustrated embodiment is a turbine blade which has a dovetail-like root 40 which is used to fix the blade to a support rotor or shaft. The blade portion 39A (shown in dotted lines in FIG. 1A) of the part 36 is encased in lead to form a generally rectangular package 39, with the root 40 projecting outwardly therefrom in cantilevered fashion. The root 40, as a result of machining, typically has a plurality (here four) of sharp corners or edges which must then be deburred so as to remove excess material therefrom.

More specifically, the root 40 of part 36 defines thereon a pair of end edges 39B which respectively transversely intersect a pair of side edges 39C (only one of which is shown in FIG. 1A).

In the illustrated embodiment, the robot 34 is a floor-mounted FANUC M-16i industrial robot.

Figure 2:
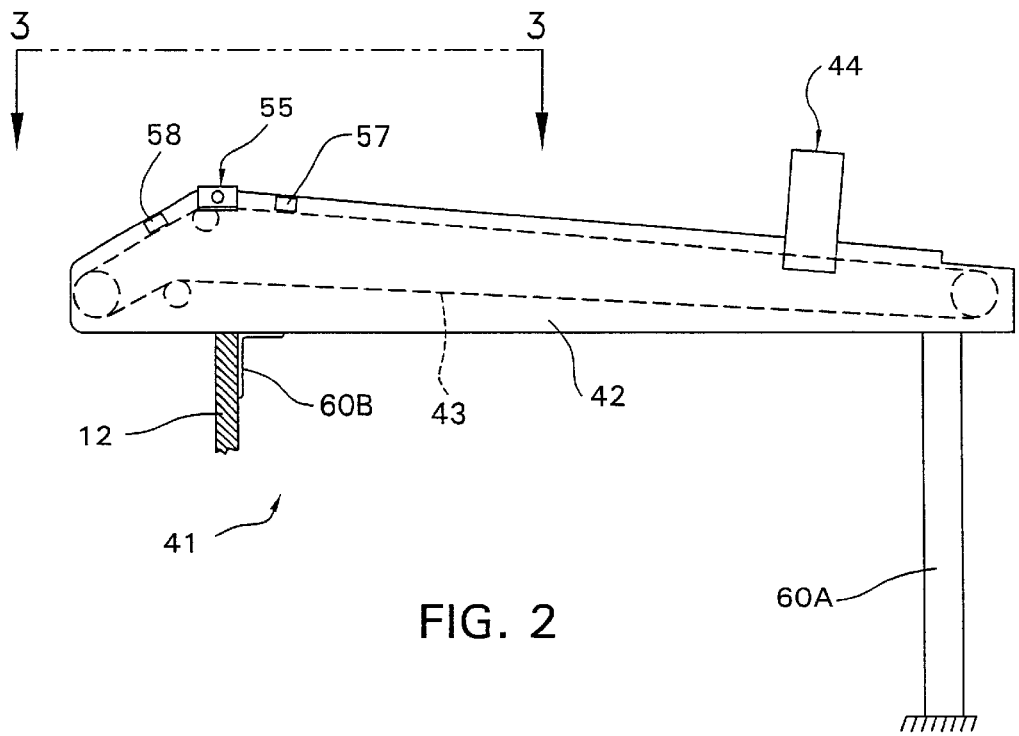
FIG. 2 is an enlarged, fragmentary, elevational side view of the infeed conveyor.
Figure 3:
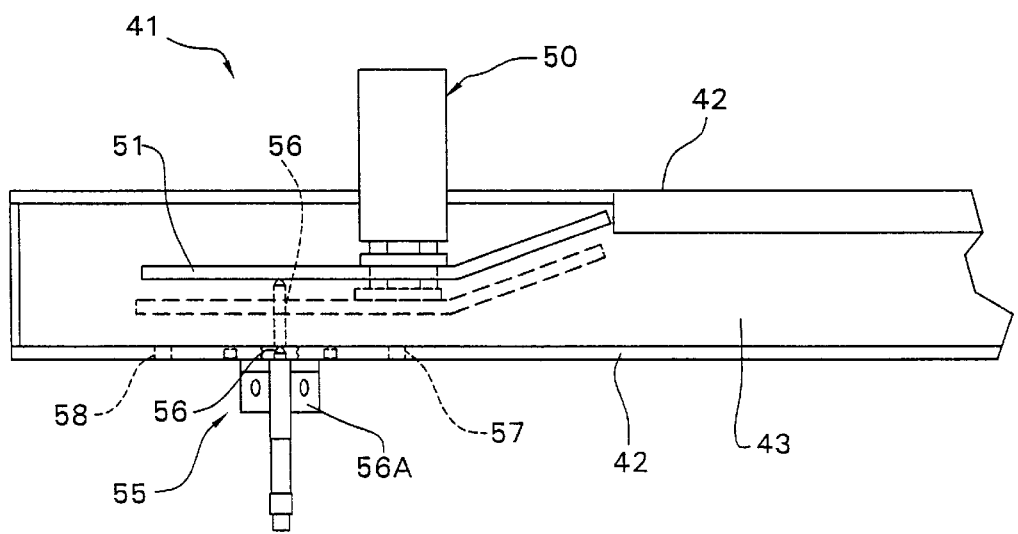
FIG. 3 is an enlarged, fragmentary plan view of the infeed conveyor as seen generally along line 3—3 in FIG. 2.

Turning now to the infeed-outfeed conveyor station with reference to FIGS. 1–3, same includes an infeed or supply conveyor 41 having a pair of generally upright and spaced-apart side walls 42 and an endless conveyor belt 43 disposed therebetween. The side walls 42 and belt 43 together define a generally U-shaped channel. Belt 43 is driven in a conventional manner via a motor (not shown) in the direction indicated by the arrow in FIG. 1 so as to advance a supply of parts 36 toward and into the part orienter station 31. Supply conveyor 41 also includes a manual push-button 45 which serves as an emergency stop, and when activated shuts the robot 34 down and stops movement in all stations within the cell 11. A switch assembly 44 is also provided and is mounted in overhead vertically spaced relation to belt 43.

Switch assembly 44 is embodied by a conventional limit switch with a movable spring-biased arm (not shown). The switch arm is oriented relative to belt 43 so that if a part 36 is placed on belt 43 in an upright manner (i.e. so that the root 40 is uppermost for example) the part 36 will contact or strike the switch arm and rotate same to a limit position which operates to cut the power supply to conveyor 41 and thus stop movement thereof, while simultaneously triggering an alarm so that the misloaded part 36 can be removed or repositioned as necessary.

Stop assembly 44 as described above also serves to prevent other inappropriate objects (such as a drink container) from being conveyed into cell 11.

As shown in FIG. 3, a fluid-actuated piston-cylinder assembly 50 is mounted adjacent the side wall 42 of conveyor 41 and serves to manipulate an angled guide member 51 in a selected position atop belt 43. The position of guide member 51 relative to the opposed or facing side wall 42 may be adjusted based upon the dimensions of part 36 so as to correctly position part 36 for feeding into the part orienter 31. Another possible position of the guide member 51 is illustrated in dotted lines in FIG. 3. Further, an additional fluid-actuated piston-cylinder assembly 55 including a slidably movable stop piston or pin 56 is mounted on side wall 42 opposite cylinder assembly 50 via a mounting bracket 56A. Pin 56 is selectively movable between an extended position wherein same is positioned substantially adjacent the inwardly facing surface of guide member 51 and transversely across belt 43 (shown in dotted lines in FIG. 3) so as to effectively block parts 36 from advancing further on belt 43, and a retracted position (shown in solid lines in FIG. 3) to allow a part 36 to advance into the part orienter station 31.

As shown in FIG. 2, a pair of sensors 57 and 58 are respectively provided upstream and downstream of stop pin 56. More specifically, sensors 57 and 58 are mounted on and extend through side wall 42 and serve to detect the presence of a part 36 on belt 43. The side walls 42 of conveyor 41 in the illustrated embodiment project upwardly beyond the upper surface of belt 43, and sensors 57 and 58 are mounted along side wall 42 at a slight vertical distance above belt 43. Once a part 36 has been loaded onto infeed conveyor 41 (and has successfully passed stop assembly 44 as discussed above), upstream sensor 57 detects the presence of the part 36 just before same reaches the area of stop pin 56 so that stop pin 56 can be extended to stop the part 36 from further advancement into the part orienter station 31. The stop pin 56 is then retracted at the appropriate time (i.e. when the part orienter station 31 is ready to receive the part 36) to allow the part 36 to advance along the downwardly inclined portion of belt 43 and into the part orienter station 31. Downstream sensor 58 detects movement of the part 36 past stop pin 56 and towards part orienter station 31, as discussed further below.

Conveyor station 30 additionally includes an outfeed or discharge conveyor 52 positioned in side-by-side relation with infeed conveyor 41 as shown in FIG. 1. Discharge conveyor 52 includes a pair of side walls 53 and an endless belt 54 disposed therebetween and driven in an opposite direction (see arrow in FIG. 1) from belt 43. Finished parts 36 are placed on belt 54 by the robot clamp 35 after processing.

A sensor 59 (FIG. 1) is provided in side wall 53 (i.e. the side wall 53 closest to supply conveyor 41) of discharge conveyor 52. Sensor 59 detects the accumulation of finished parts 36 on belt 54, and when the number of parts 36 on belt 54 exceeds a predetermined amount, an alarm is triggered so that the finished parts 36 can be removed or unloaded.

In the illustrated embodiment, sensors 57, 58 and 59 are electronic through-beam sensors.

The supply and discharge conveyors are supported in spaced relation from a floor via an upright frame member or support post 60A, (only one of which is shown in FIG. 2 in association with supply conveyor 41) and so that the inner ends thereof project into the enclosed working area 15 adjacent the part orienter station 31. Further, as discussed above, the belt 43 adjacent the innermost end of supply conveyor 41 angles downwardly by approximately 30 degrees (See FIG. 4) relative to the horizontal.

The inner ends of the supply and discharge conveyors 41 and 52 each mount thereon a corner-shaped bracket 60B at lower ends thereof (only one of which is shown in FIG. 2 in association with supply conveyor 41) which are fixed to an outer surface of side wall 12 of cell 11 to support the inner ends of the conveyors 41 and 52 in vertically spaced relation above the floor. In addition, a control unit 60C is provided which includes the motor controls for operation of the belts 43 and 54.

Figure 4:
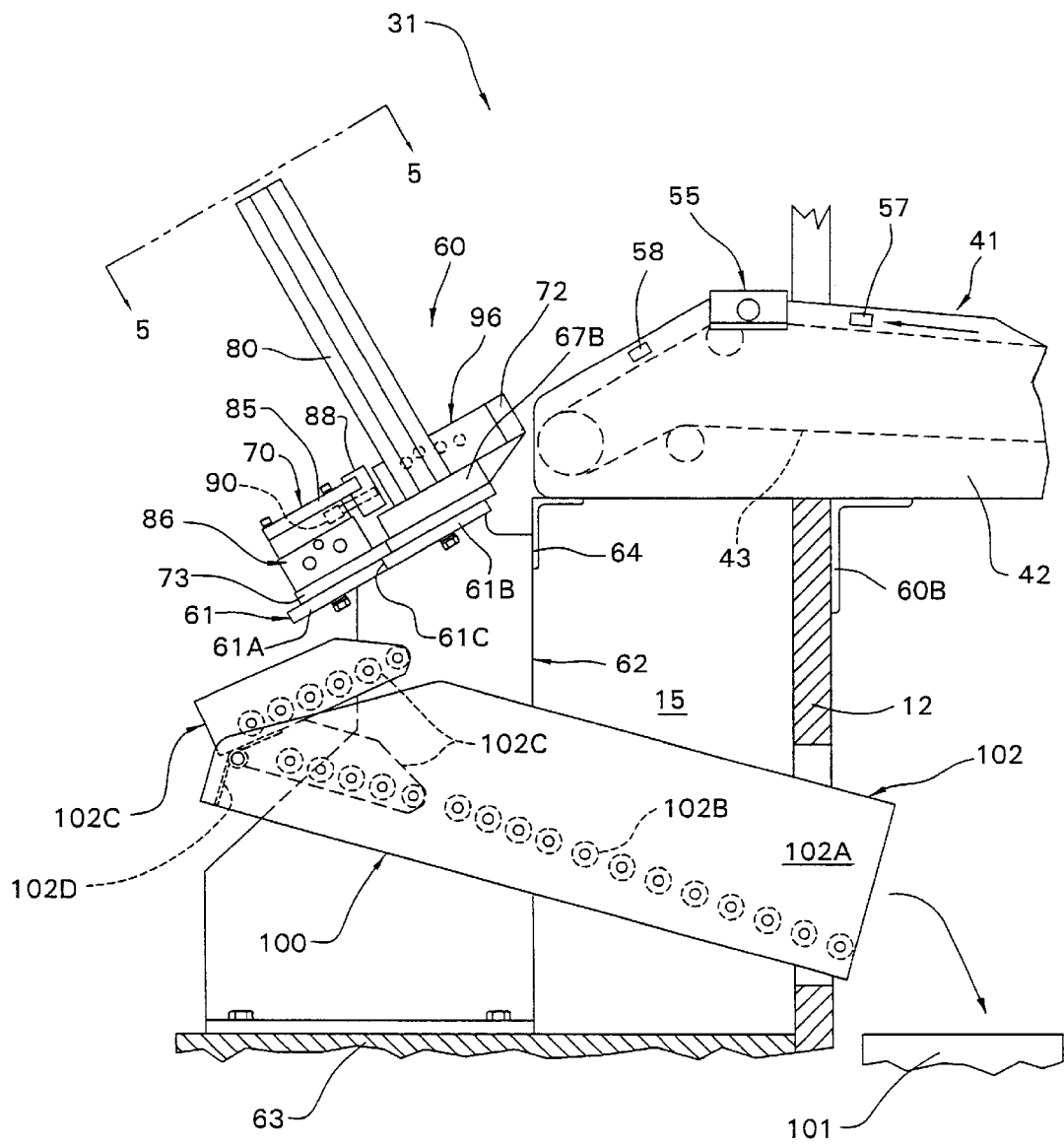
FIG. 4 is an enlarged, fragmentary, elevational view of the part orienter station and infeed conveyor taken generally along line 4—4 in FIG. 1.

As shown in FIG. 4, the part orienter station 31 includes an orienter assembly 60 which is positioned immediately adjacent the inner end of the supply conveyor 41, and in the illustrated embodiment is mounted at an angle of approximately 30 degrees relative to the horizontal. Orienter assembly 60 is supported in this angled orientation via an angled mounting plate 61 of an upright stand 62. The lower end of stand 62 is fixed to a support platform or other structure 63 located within the interior area 15 of cell 11. Stand 62 also includes a corner-shaped bracket 64 which supports the inner end of supply conveyor 41.

The mounting plate 61 in the illustrated embodiment is corner-shaped and is defined by first and second legs 61A and 61B which are generally perpendicular to one another. This perpendicular orientation of legs 61A and 61B of plate 61 defines a recess or inset area 61C for a purpose discussed further below.

Figure 6:
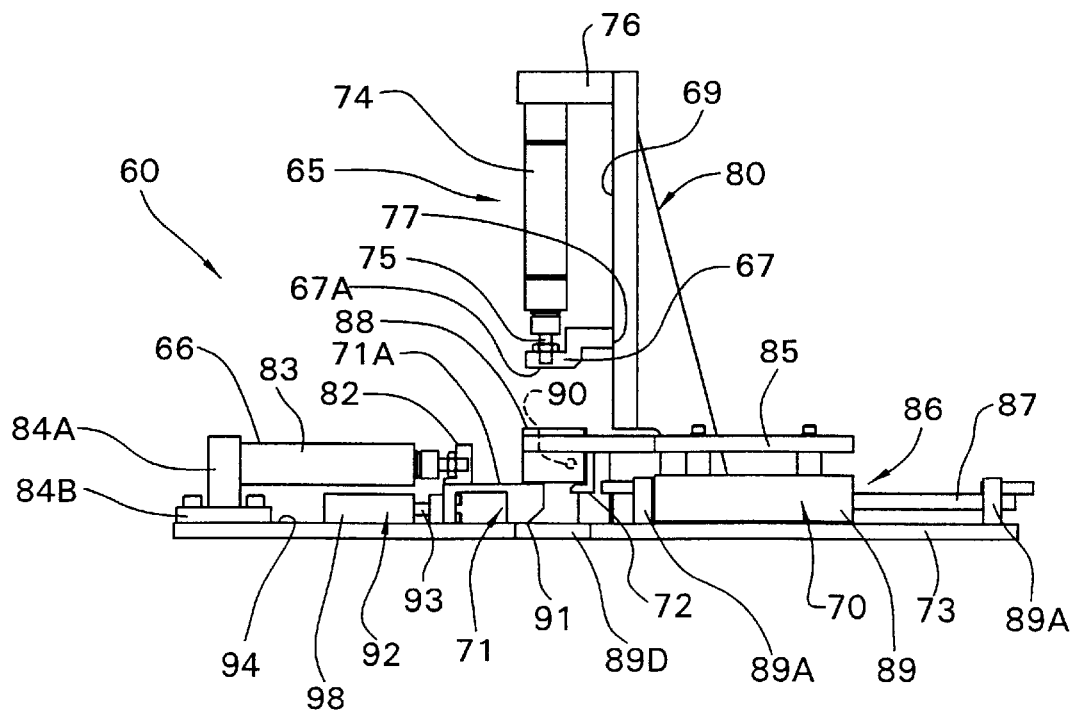
FIG. 6 is a side view of the part orienter assembly as seen generally along line 6—6 in FIG. 5.

Orienter assembly 60 generally includes fluid-actuated upper and side cylinder units 65 and 66, a front gate assembly 70, a bottom slide plate 71 and a fixed and generally J-shaped guide member 72, all of which are supported atop a generally planar and elongate mounting plate 73 fixed atop stand plate 61. Referring to FIG. 6, the upper cylinder unit 65 includes a cylinder housing 74 and a piston rod 75 slidably disposed therein. The cylinder unit 65 is supported via an upright support arm 80 which positions the cylinder unit 65 in an upright or generally vertical manner. The free lower end of the piston rod 75 mounts a clamp member 67 thereon which is guided for vertical movement along an inner surface 69 of arm 80. The unit 65 is a conventional position-feedback cylinder which serves to measure the vertical linear distance which the piston rod 75

(and/or the associated piston (not shown) located within cylinder housing 74) travels between a retracted uppermost position (as shown in solid lines in FIGS. 6 and 7) and an extended lowermost position (shown in dotted lines in FIG. 7), wherein a lower generally planar surface 67A clamp member 67 engages and clamps the upper side of the package 39 of part 36, which distance is compared to a predetermined value based upon specific part dimensions.

In the illustrated embodiment, support arm 80 is fixed to mounting plate 73 via a generally planar lower base portion 67B. The upper end of cylinder housing 74 is fixedly supported by a generally horizontally oriented mounting leg 76 which is cantilevered from an uppermost end of arm 80. The clamp member 67 of piston rod 75 is generally S-shaped (FIG. 6) and defines thereon a generally vertical planar surface 77 which engages and slides vertically up and down along surface 69 of arm 80 during movement of piston rod 75 relative to cylinder housing 74. The engagement and guiding contact of surface 77 along surface 69 prevents rotation of piston rod 75 relative to cylinder housing 74.

The side cylinder unit 66 is similar to cylinder unit 65 but is mounted in a generally horizontal manner on plate 73. Side cylinder unit 66 includes a cylinder housing 83 and a piston rod 81, the free end of which mounts thereon a generally J-shaped clamp member 82 (FIG. 6). A lower flange 84 of clamp member 82 slides along the upper surface 71A of bottom slide plate 71. The unit 66 serves to measure the horizontal linear distance which the piston rod 81 (and/or the associated piston (not shown)) travels from the retracted leftmost position (as shown in solid lines in FIGS. 5–7 and 9–11) and the extended rightmost position (shown in dotted lines in FIG. 7) wherein an upper flange 84C of clamp member 82 engages and clamps the side surface of the package 39 of part 36.

As shown in FIG. 6, the end of cylinder housing 83 opposite clamp member 82 is supported in vertically spaced relation from plate 73 via a generally upright mounting arm 84A which is cantilevered generally upwardly from a base plate 84B fixed to plate 73.

Figure 5:
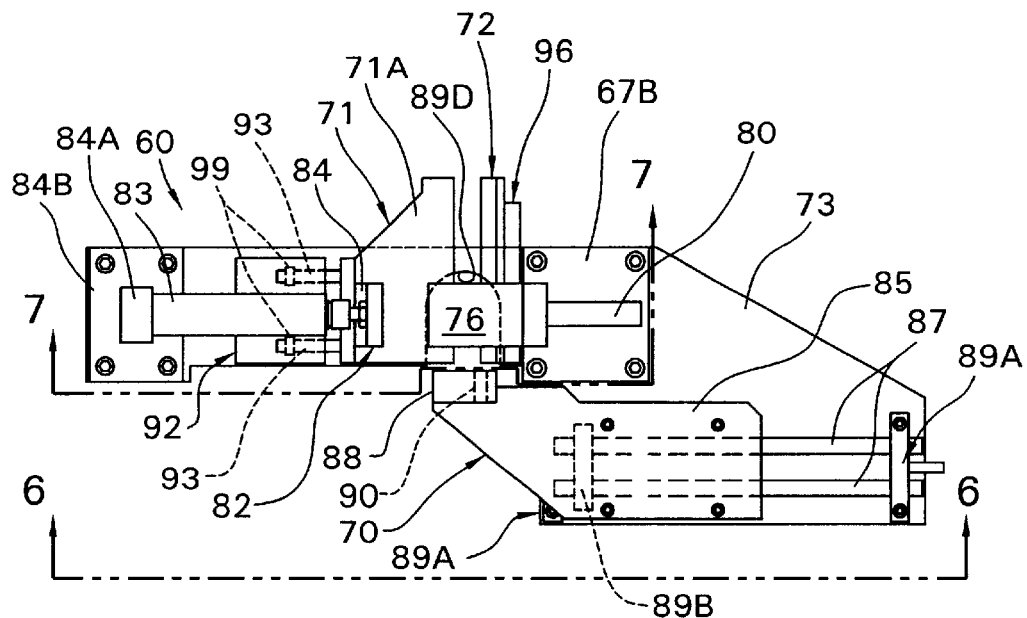
FIG. 5 is a plan view of the part orienter assembly as seen generally along line 5—5 in FIG. 4.
Figure 9:
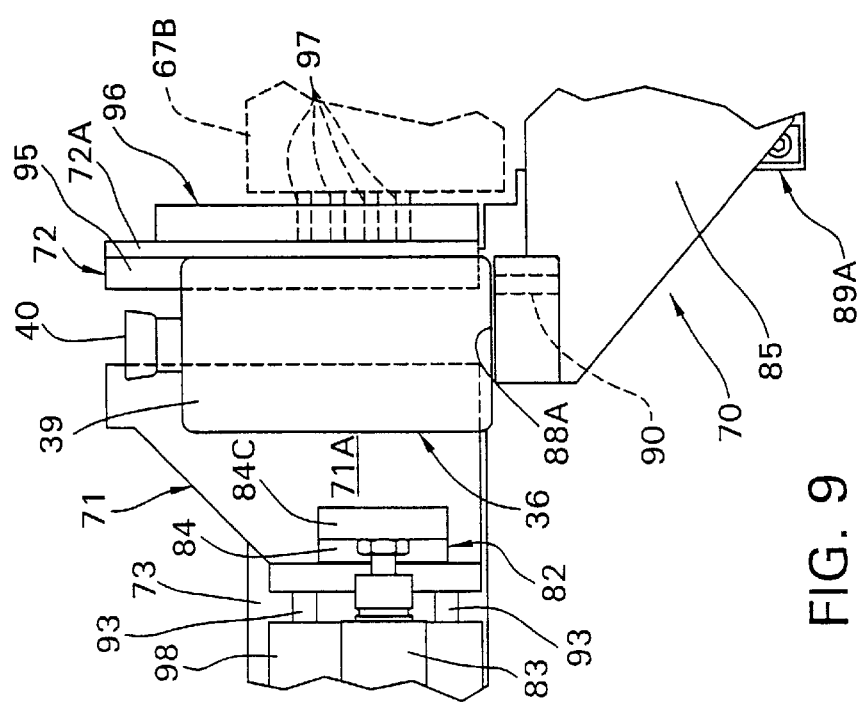
FIG. 9 is a fragmentary plan view of the side cylinder assembly and the front gate assembly with the part in a proper end-to-end orientation upon being fed into the part orienter station from the infeed conveyor.

The front gate assembly 70 includes a generally horizontally oriented arm 85 which is associated with a conventional fluid-actuated powered slide assembly 86. The slide assembly 86 includes a block-like member 89 which non-movably mounts thereon arm 85. The block-like member 89 and arm 85 are horizontally slidably movable along a pair of guide rods 87. As shown in FIG. 5, the end of the arm 85 located adjacent bottom slide plate 71 mounts thereon a stop pad 88. Stop pad 88, as shown in FIGS. 5, 6 and 9, incorporates therein an electronic proximity sensor 90 (shown in dotted lines) positioned adjacent a generally vertically oriented stop surface 88A of pad 88.

The guide rods 87 are generally parallel to one another, extend generally horizontally and are vertically spaced from plate 73 via a pair of spaced-apart support structures 89A fixed to plate 73. The guide rods 87 extend completely through the block-like member 89 and are associated with a piston 89B (shown in dotted lines in FIG. 5) disposed within block-like member 89 and non-movably fixed to guide rods 87. A pair of chambers (not shown) are defined within member 89 on opposite sides of piston 89B and pressurized fluid (such as air) is supplied to the appropriate chamber (for example through guide rods 87) so as to selectively position the arm 85 and stop pad 88 in the blocking position (shown in FIGS. 5, 6, 9 and 11) and the open position (shown in FIG. 10). Other arrangements may be provided in place of slide assembly 86 for actuating arm 85.

Figure 10:
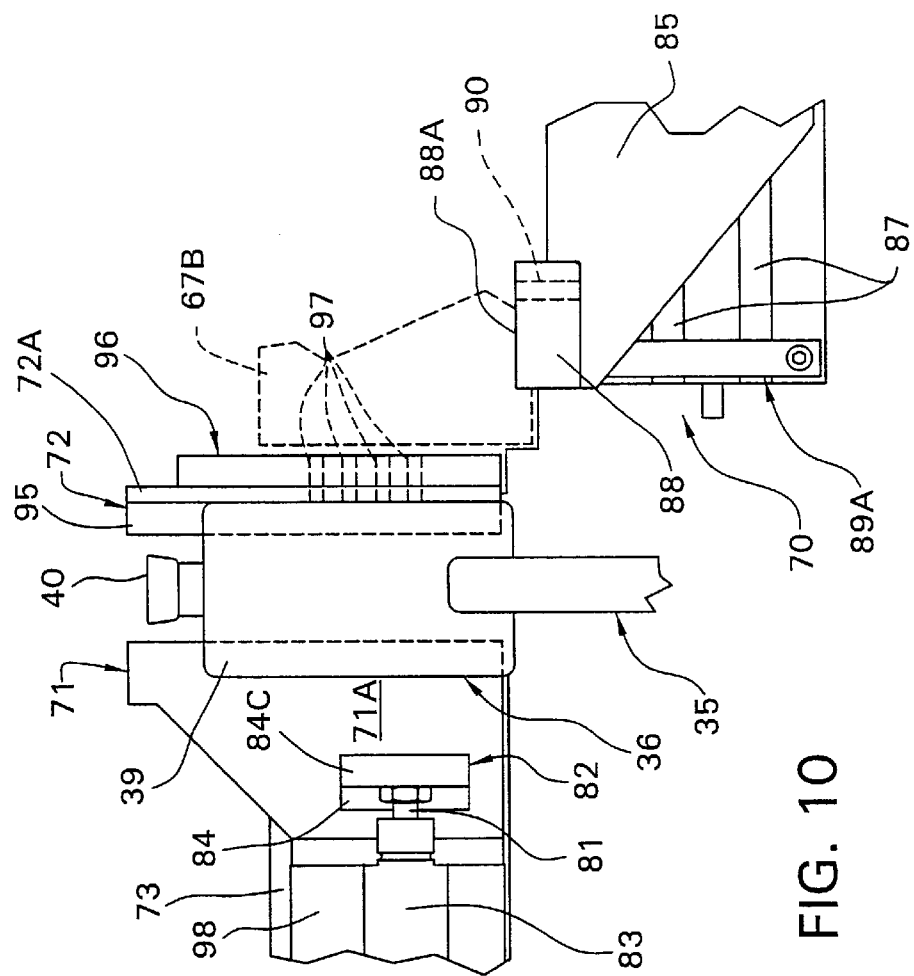
FIG. 10 is a view similar to FIG. 9 showing the front gate assembly and bottom slide plate in retracted positions and the robot clamp in position for part pickup.

Turning now to bottom slide plate 71, same has a lower surface 91 which engages and slides along an upper surface 94 of support plate 73. A conventional fluid-actuated twin-rod cylinder assembly 92 having a pair of piston rods 93 with outer free ends fixed to bottom slide plate 71 is provided to move slide plate 71 into extended and retracted positions. The extended position of plate 71 is shown in FIGS. 5–7, 9 and 11, and the retracted position is shown in FIG. 10. The upper surface 71A of slide plate 71 and an upper surface 95A of lower flange 95 of the J-shaped fixed guide member 72 are oriented in the same plane and together define a non-continuous planar support platform for supporting the outer edges of part 36. An optic sensor arrangement 96 is provided sidewardly adjacent fixed guide member 72, and includes a plurality (here four) of optic sensors 97 which project through an upper vertical leg 72A of fixed guide member 72.

The cylinder assembly 92 includes a block-like housing 98 which is fixed to plate 73 and encloses a pair of cylinders (not shown). Each piston rod 93 mounts thereon a piston 99 (shown in dotted lines in FIG. 5) which slides within a respective cylinder. Pressurized fluid (such as air) is supplied to the appropriate chambers defined within each of the cylinders on opposite sides of the respective piston 99 to move the slide plate 71 between the extended and retracted positions. Other types of actuating mechanisms may be substituted for cylinder assembly 92 for moving slide plate 71.

Figure 7:
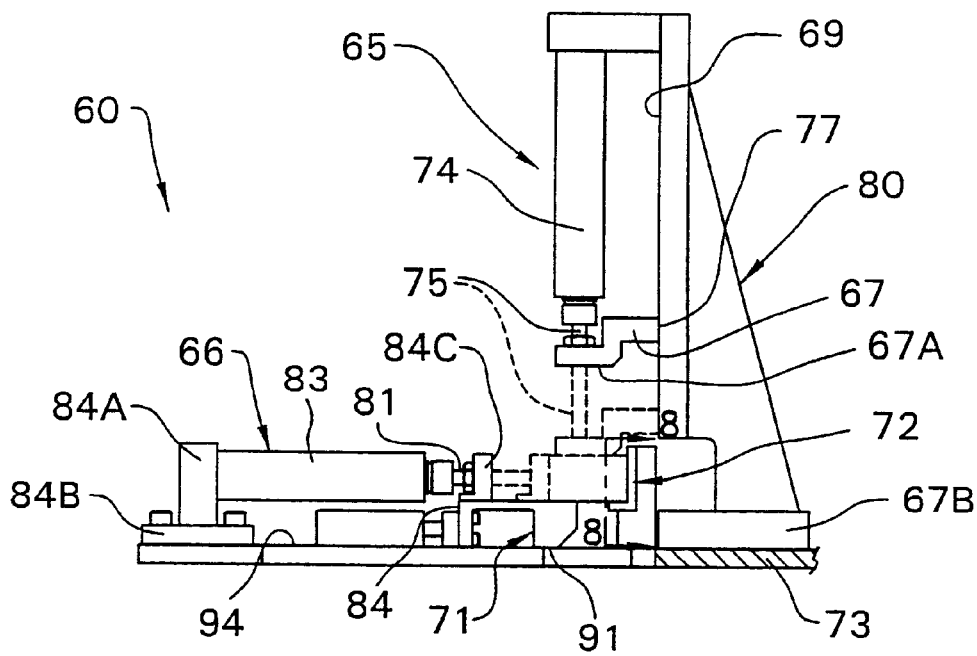
FIG. 7 is a cross-sectional view taken generally along line 7—7 in FIG. 5.
Figure 8:
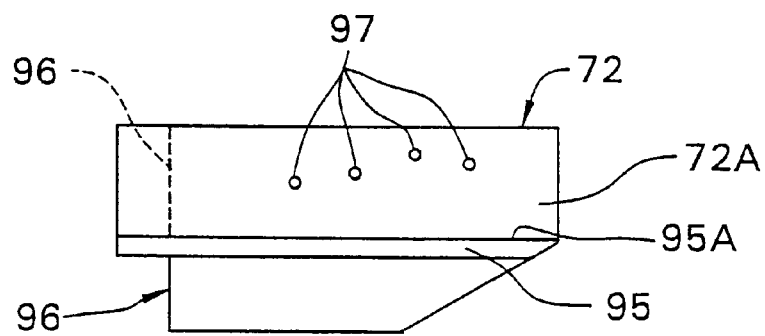
FIG. 8 is an enlarged view of the part guide member and optic sensor arrangement as seen generally along line 8—8 in FIG. 7.

The functioning of part-orienter station 60 will now be described with reference to FIGS. 7, 9 and 10. It will be appreciated that the upper cylinder unit 65 is not shown in FIGS. 9–11 for clarity purposes. After a part 36 has reached the inner downwardly angled reach of belt 43 of supply conveyor 41 (after passing stop pin 56), the part 36 is transferred and guided into the part orienter assembly 31 via fixed jaw 72 and slide plate 71. At this juncture, front gate assembly 70 is in the blocking position as illustrated in FIG. 9. The sensor 90 of stop pad 88 first determines whether the part 36 is oriented correctly (i.e. with the root 40 oriented outwardly as shown in FIG. 9) by sensing for the presence of metal immediately adjacent stop surface 88A of front gate 88. If the sensor 90 senses metal (i.e. the rectangular block-like package 39 of part 36), then the side cylinder unit 66 and the upper cylinder unit 65 are actuated to move the respective clamp members 82 and 67 thereof toward and into engagement with the respective side and upper surfaces of the block-like package 39 of part 36 to thus properly position and hold the part against the vertical side of fixed jaw 72 and the upper surface of slide plate 71. The horizontal and vertical distances moved by the piston rods 81 and 75 of the respective cylinder units 66 and 65 are measured and compared with predetermined values which indicate whether the loaded part 36 is the proper size. At approximately the same time, the optic sensors 97 detect notches (not shown) formed in the side of the part 36 (which, if the part 36 is properly oriented, should be positioned adjacent flange 72A of guide member 72) and determine whether the proper type of part 36 has been loaded. If all of the above arrangements sense satisfactory conditions, then the piston rod 75 of the top cylinder unit 65 is retracted so as to unclamp the top of part 36, the front gate assembly 70 is moved sidewardly into the position shown in FIG. 10 while the clamp 35 of robot 34 is moved into position to pick up the part 36 for transfer to the next station. In addition, the slide plate 71 is retracted (i.e. to the left as shown in FIG. 10) to move same away from fixed guide 72 and allow unhindered entry of clamp 35 into an arcuate and sidewardly-opening recess 89D (FIGS. 5 and 6) which is vertically aligned with recess or inset area 61C of support platform 63 of plate 73. When the robot clamp 35 is grippingly engaged with part 36, the piston rod 81 and clamp member 82 of the side cylinder unit 66 are retracted to free the part 36 so that the clamp 35 can pick up same. It will be appreciated that the slide plate 71 in its retracted position (FIG. 10) remains under part 36 to support same during pick up by robot 34.

Figure 11:
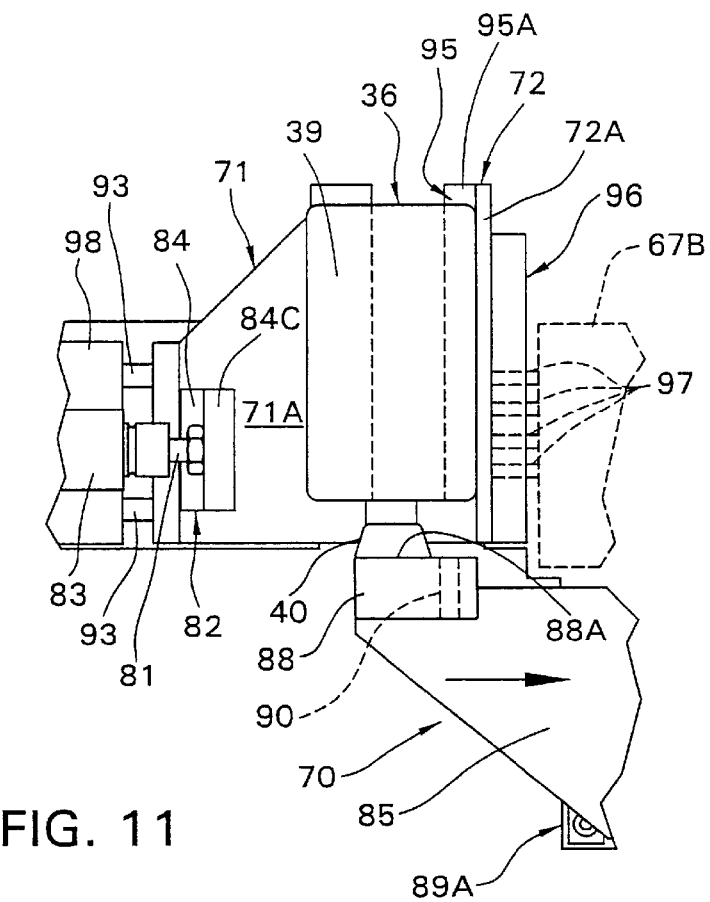
FIG. 11 is a view similar to FIGS. 9 and 10 showing the part in an improper end-to-end orientation.

In the event that the cylinder units 65 or 66, sensors 97, or front gate sensor 90 signal an unsatisfactory condition, then the front gate assembly 70 is moved to the right from the position illustrated in FIG. 9 and the part 36 is discharged via gravity to a part orienter discharge conveyor 100 (FIG. 4) and transported to a receptacle 101 outside of the cell 11. As shown in FIG. 2, the discharge conveyor 100 is mounted to stand 62 and is located beneath the part orienter assembly 60. One type of unsatisfactory part-loading condition is illustrated in FIG. 11, wherein the part 36 is oriented with the root 40 thereof disposed inwardly (i.e. adjacent front gate 88). In this case, the sensor 90 does not sense part 36 since sensor 90 is spaced from package 39 of part 36 and is sidewardly offset relative to the position of root 40, and the gate assembly 70 is moved to the right as indicated by the arrow in FIG. 11 to allow the part 36 to drop into the discharge conveyor 100.

More specifically, and referring back to the point at which the part 36 has passed the stop pin 56 and downstream sensor 58 of supply conveyor 41 and is moving along the downwardly angled reach of belt 43 toward part orienter station 31, if the sensor 90 of stop pad 88 has not sensed or signaled the block-like package 39 of part 36 within a predetermined time period (for example, ten seconds) as measured from the time at which the downstream sensor 58 signals the passing of part 36 relative thereto, then the part 36 is most likely in the incorrect orientation illustrated in FIG. 11 and is rejected as discussed above. The downstream sensor 58 thus performs two functions, the first of which is to start a timer once a part 36 has passed sensor 58 on belt 43, and the second of which is to signal the cylinder assembly 55 to extend stop pin 56 to block the advancement of the next part 36 on belt 43 until the appropriate time.

Referring back to FIG. 4, the part orienter discharge conveyor 100 includes a generally U-shaped channel member 102 which is mounted on stand 62 so as to angle downwardly. Channel member 102 includes a pair of upright side walls 102A (only one of which is shown in FIG. 4) and a bottom wall defined by a plurality of rotatable rollers 102B. The channel member 102 mounts thereon a smaller upper channel member 102C also having rollers 102B. Upper channel member 102C is pivotally mounted to the upper end of lower channel member member 102 and is biased upwardly relative thereto by a torsion spring 102D. Thus, the rejected part 36 drops from orienter assembly 60 and into channel member 102C, and the weight of the part 36 causes member 102C to rotate clockwise into the lower position illustrated in dotted lines in FIG. 4. The part 36 then moves along rollers 102B and ultimately drops into receptacle 101. Alternative discharge arrangements may be utilized in place of conveyor 100, and the above is presented only as an example of one type thereof.

If the loading of the part 36 into the part conveyor assembly is correct as determined by the cylinder units 65 and 66, sensors 97 and front gate sensor 90 as discussed above, then the clamp 35 of robot 34 picks up the part 36 and transfers same to the deburring station 32 for processing.

Figure 12:
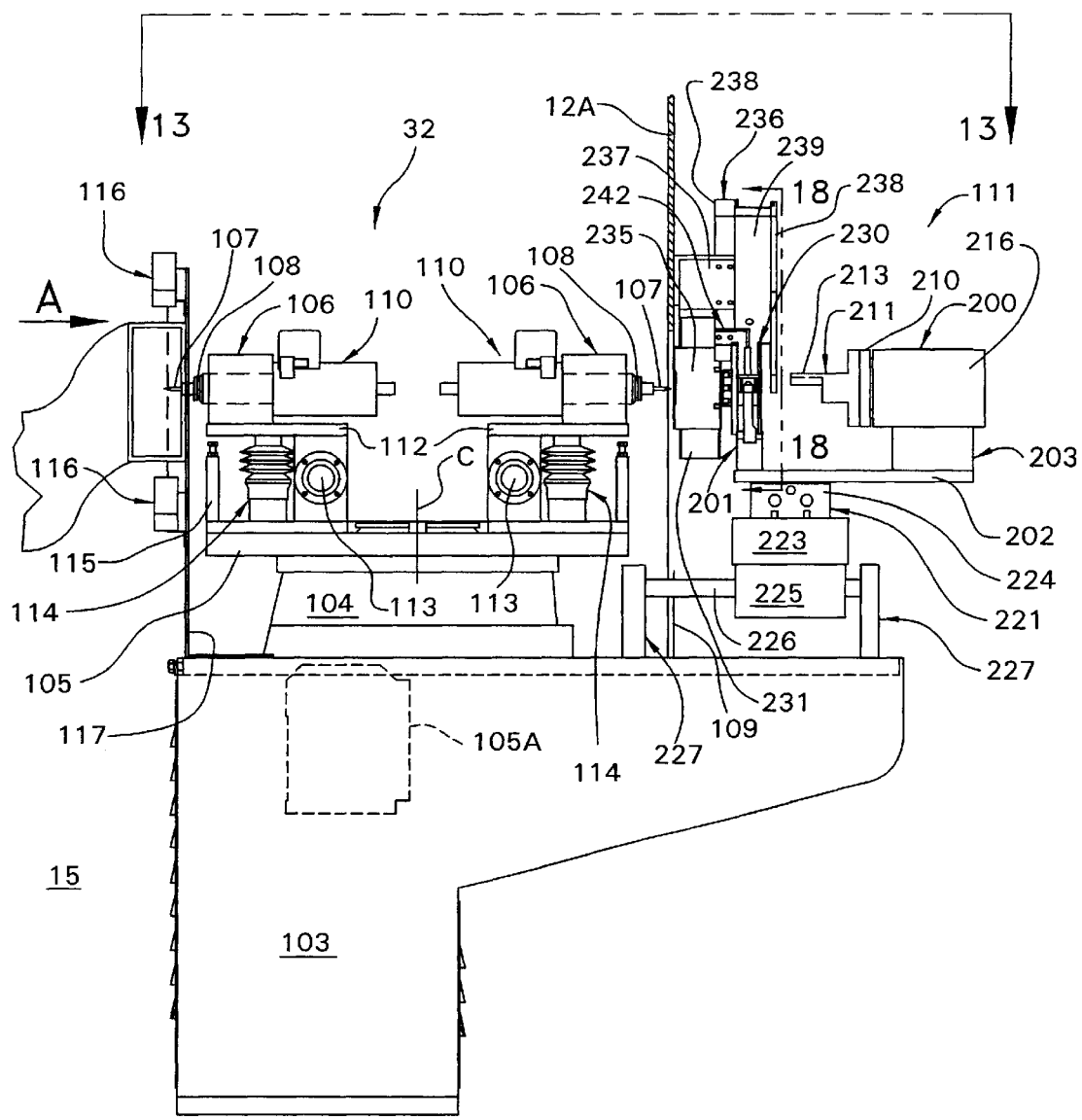
FIG. 12 is an enlarged, fragmentary side elevational view of the deburring station and the tool supply/replacement station as seen generally along line 12—12 in FIG. 1.
Figure 13:
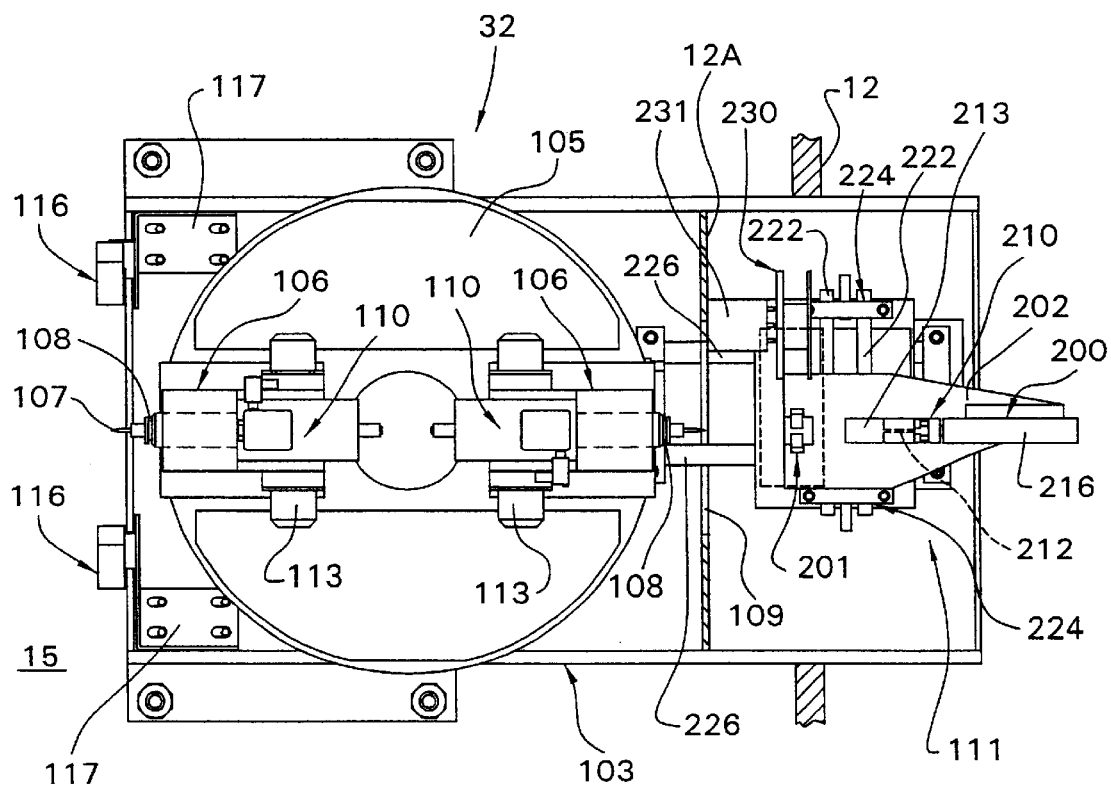
FIG. 13 is a plan view of the deburring station as seen generally along line 13—13 in FIG. 12.

As shown in FIGS. 12 and 13, the deburring station 32 generally includes a lower support frame 103, a base 104 positioned atop frame 103 and a tool turret 105. The tool turret 105 is rotatable about a vertical axis C via an electric motor 105A (shown in dotted lines in FIG. 12) and mounts thereon a pair of tool heads 106 which are diametrically positioned relative to one another atop turret 105. Each tool head 106 includes a hard drill-like deburring or cutting tool 107 supported in a collet 108 and rotated at a high speed by an electric motor 110. In the illustrated embodiment, the tool 107 is constructed of carbide. The tool 107 of the active head 106 is disposed within the interior area 15 of cell 11, and the tool 107 of the inactive opposite head 106 projects through a window 109 defined in a panel or side wall 12A which communicates with a tool supply and replacement device or station 111 (shown schematically in FIG. 1) disposed outside the wall 12A. The tool supply and replacement station 111 has the capabilities of removing an old tool 107 from its respective collet 108, and reloading a new tool 107 from a tool cartridge which contains a large number of tools so that one can be discharged from the cartridge and mounted in the respective collet 108 as discussed further below. The tools 107 are extremely durable and are thus capable of processing or cutting a large number of parts 36 (for example 100–150), and thus the rotatable turret 105 will automatically index the two tool heads 106 back and forth between the cutting area inside the cell 11 and the tool supply and replacement station 111 so that new cutting tools can be automatically supplied after a predetermined number of parts have been processed.

Each tool head 106 is mounted atop a support platform 112. The support platform 112 supports the respective tool head 106 for floating or pivoting movement about a fulcrum 113 defining a horizontal pivot axis. An air cylinder arrangement 114 is mounted between the platform 112 and the tool turret 105 and is programmed to maintain a constant upwardly-directed bias on the respective tool 107 for a purpose discussed further below. As shown in FIG. 12, an adjustable vertical stop 115 is mounted on tool turret 105 for limiting the downward pivoting movement of the respective platform 112. Further, a pair of laser sensors 116 are provided within the interior 15 of cell 11 which cooperate with the rotating tool 107 of the active tool head 106. In the illustrated embodiment, the laser sensors 116 are opposed to one another and are oriented to emit a laser beam (shown in dotted lines in FIG. 12) in the vertical plane of the tool 107. Sensors 116 detect whether the tool 107 is wobbling or moving horizontally into or out of the respective collet 108, or whether the tool 107 is bent or has a broken tip.

In the illustrated embodiment, the sensors 116 are mounted atop frame 103 via respective generally L-shaped mounting brackets 117 which position the respective sensors 116 at approximately the ten and four o'clock positions (when viewed from the direction indicated by arrow A in FIG. 12) so as to allow for easier and unhindered movement of the robot arm 37 between sensors 116 and into position for deburring or cutting of part 36.

Further, a dust collector 118 (shown in FIG. 12 only) may be provided adjacent the active tool 107 and within interior 15 to remove (by suction) debris generated at the tool 107 from interior 15.

The robot 34, which has been previously programmed or taught several points along the profile of the root 40 of the particular part 36 to be deburred, moves part 36 from the part orienter station 31 toward the deburring station 32. The active tool head 106 continuously rotates the respective tool 107 (i.e. the tool 107 is rotating prior to arrival of the part 36 at station 32). The laser sensors 116 sense whether the active tool 107 is broken, bent or improperly positioned within the respective collet 108 before the part 36 is in position for deburring, and if the sensors 116 detect an unsatisfactory condition, then an appropriate signal is emitted so as to stop advancement of the part 36 and to rotate the previously inactive tool head 106 into position for deburring part 36. Alternatively, and if only one tool head 106 is operational, the active tool head 106 may be rotated to the tool supply and replacement station 111 for tool removal and replacement as discussed further below, and thereafter rotated back to the working position inside cell 11 for deburring.

Once the sensors 116 have determined that a tool 107 is in satisfactory condition for deburring, the robot 34 moves the part 36 into position for processing. As mentioned above, the robot 34 has been taught several points along the profile of the root 40 of the particular part 36 being processed so as to define a path of robot movement for proper deburring. However, due to the "passive" upward bias on the tool 107 via air cylinder 114, the path of robot movement need not be exact. More specifically, the part root 40 is moved along a predefined path by the robot 34 so that the tool 107 engages and removes excess material along the edges of the root 40, and the vertical bias of the tool 107 allows a predefined amount of vertical play which compensates for the non-exact path of robot movement and allows the tool 107 to follow and remain engaged with the root 40.

Figure 13A:
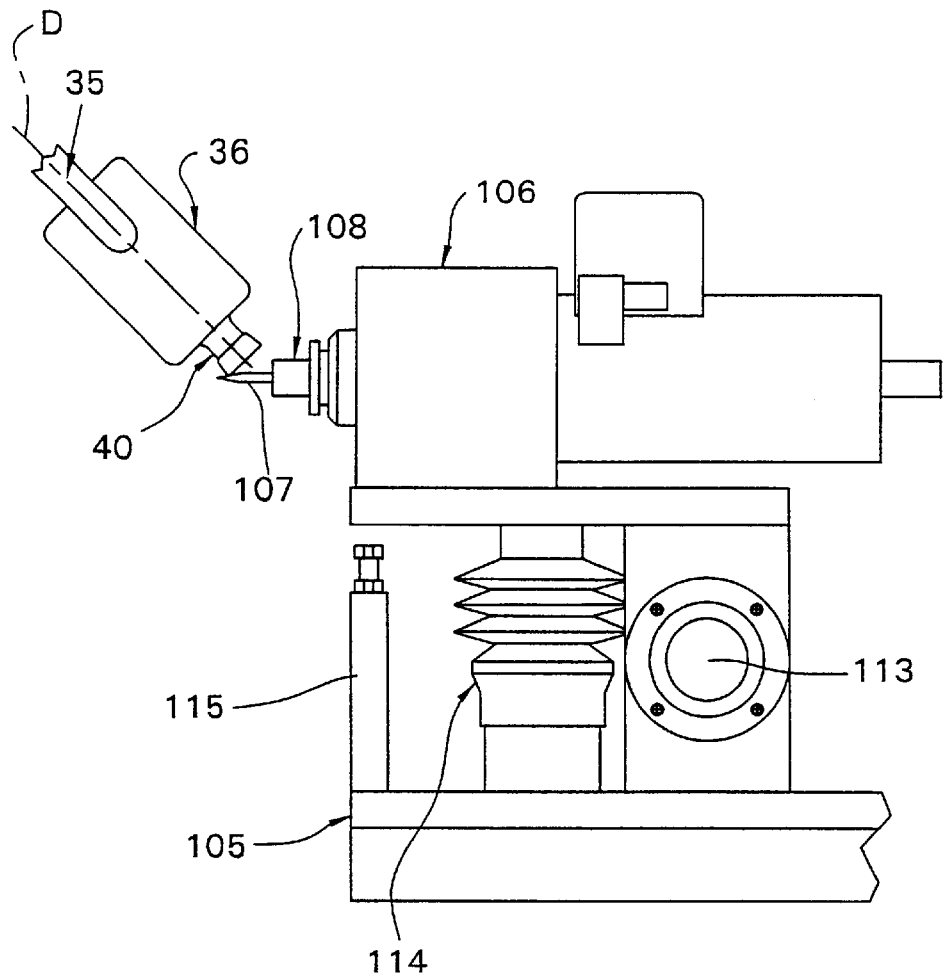
FIG. 13A is an enlarged, fragmentary side view of the robot clamp positioning the part in engagement with an active tool.

More specifically, and as shown in FIG. 13A, the tool 107 in the illustrated embodiment is biased upwardly and the clamp 35 of robot 34 positions the part 36 at the appropriate angle relative to tool 107 so that the tool 107 engages one of the corners or edges of root 40 and creates a bevel or chamfer thereat. The robot 34 moves the part 36 along the tool 107 so that the part 36 exerts a downwardly directed force thereon in opposition to the upward bias provided by air cylinder 114. The robot 34 moves the part 36 relative to tool 107 to deburr an entire edge, and once this edge is chamfered, the robot 34 backs away from the tool 107 and then rotates the part 36 approximately 900 about axis D in FIG. 13A. Once rotated, the next or new edge is deburred by moving the part 36 relative to or across tool 107. The remaining edges are thereafter chamfered in a similar manner (i.e. with the robot 34 rotating the part 36 approximately 90° about axis D at the intersection or corner of two adjacent edges).

It will be appreciated that other movement sequences of the part 36 by robot 34 may be appropriate based upon the particular part 36 and robot capabilities. For example, it may be possible to maintain essentially constant engagement of the active tool 107 with the root 40 during deburring by programming the robot 34 to move the part 36 along a continuous path so as to remain in constant engagement with the tool 107.

Once the part 36 has been deburred, the robot 34 moves the part 36 away from the deburring station 32 and towards brushing station 33. After the part 36 is moved away from station 32, the laser sensors 116 again sense the condition and orientation of the active tool 107 as discussed above, and if the tool 107 is broken or inappropriately positioned subsequent to a cutting operation, then an appropriate signal is emitted to stop the advancement of the part 36 by robot 34, and to either rotate the inactive tool head 106 into position for processing of the next part 36 (which serves to move the active head 106 into position for tool removal and replacement), or if only one tool head 106 is operational, then the active tool head 106 is rotated for part removal and replacement at station 111 and then rotated back into the active position for processing of the next part 36. As mentioned above, when the sensors 116 detect an unsatisfactory condition of the tool 107 subsequent to a cutting operation, a signal is emitted so as to prevent further advancement of the possibly defective part by the robot 34, and the robot 34 then transfers the defective part to the discharge conveyor 100 of part orienter station 31 or to another receptacle, and then picks up a new part at station 31 in the manner discussed above.

Referring to FIGS. 12–13 and 14–24, the tool supply/ replacement station 111 and the cooperation thereof with the deburring station 32 will now be described. The tool supply/ replacement station 111 is located outside the side wall 12A, and in the illustrated embodiment is supported on a portion of support frame 103 which projects outwardly of side walls 12 and 12A. The side wall 12A, adjacent station 111, defines window 109 therein which communicates with the interior area 15.

Figure 17:
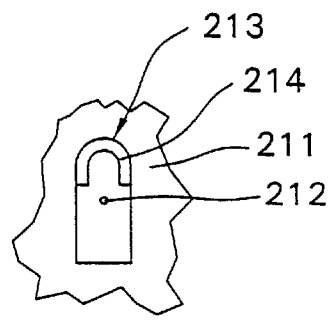
FIG. 17 is an enlarged, fragmentary view of the front face of the tool gauge.

Station 111 includes a tool gauge 200 and a tool gripper 201 which are mounted and spaced-apart from one another atop a plate-like platform 202. Tool gauge 200 has a main body portion 203 fixed to platform 202 and a gauge head 210 defining thereon a nose 211. The nose 211 projects outwardly from main body portion 203 and defines therein a sidewardly opening and generally horizontally extending blind hole or orifice 212 (see FIGS. 13 and 17). Nose 211 also includes an elongate gauge member 213 spaced vertically from and projecting horizontally beyond the mouth of orifice 212. As best shown in FIG. 17, the gauge member 213 has a generally arcuately-shaped front face 214 having a shape which generally corresponds to an arc length defined along the circular front face of the respective collets 108. The gauge head 210 is horizontally movable relative to main body portion 203 between an extended position (FIG. 24) and a retracted position (FIG. 12) via a pair of guide rods 215 which are part of a fluid-actuated twin-rod cylinder assembly 216 positioned atop main body portion 203. Cylinder assembly 216 is similar to cylinder assembly 92 discussed above and will therefore not be described further here.

Tool gripper 201 includes a pair of generally upright jaws 220 which are movable relative toward one another to grippingly engage a tool 107 therebetween, or away from one another to release a tool 107 as discussed further below. As shown in FIG. 13, the tool gripper 201 and the gauge 200 are positioned atop platform 202 so that a tool 107, when gripped between jaws 220, and orifice 212 are coaxially aligned with one another, and also with a tool receiving orifice (not shown) defined in the respective collets 108. The platform 202 is mounted for side-to-side or lateral movement relative to support frame 103 via an upper fluid-actuated powered slide cylinder assembly 221 which is similar to assembly 86 discussed above. Assembly 221 permits lateral movement of platform 202 (and thus gripper 201 and gauge 200) in a plane perpendicular to the drawing plane of FIG. 12 along guide rods 222. Guide rods 222 are generally parallel to one another and are fixed to a base 223 via a pair of laterally spaced mounting members 224 which are cantilevered upwardly from base 223 so as to support rods 222 in vertically spaced relation from the upper surface of base 223. Base 223 is itself supported atop a lower powered slide cylinder assembly 225 including a pair of parallel guide rods 226 arranged perpendicularly to guide rods 222. Guide rods 226 are spaced upwardly from support frame 103 and are fixed thereto via a pair of mounting members 227. With reference to FIG. 12, one of the mounting members 227 is disposed closely adjacent an outer edge of tool turret 105 and supports the leftmost ends of guide rods 226 which project through window 109 of wall 12A. The opposite mounting member 227 is disposed on support frame 103 generally under support platform 202.

The upper cylinder assembly 221 thus enables lateral movement of the tool gripper 202 and gauge 200 (i.e. in a plane perpendicular to the plane of the drawing in FIG. 12), and lower cylinder assembly 225 enables movement of the tool gripper 202 and gauge 200 toward and away from tool turret 105 (i.e. left and right in FIG. 12). Further, cylinder assembly 216 enables movement of the gauge head 210 toward and away from the main body portion 203 of gauge 200 (i.e. right and left in FIG. 12).

Station 111 additionally includes a tool wheel 230 and a conventional rotary actuator 231. The tool wheel 230 is embodied by a pair of plate-like discs 232 (FIG. 21) which are horizontally spaced from one another by a centrally located hub 233 which extends between the respective discs 232 and non-movably fixes the discs 232 relative to one another. The discs 232 each define therein an outwardly opening recess or notch 234. The notches 234 of the respective discs 232 are aligned with one another and together define a generally linear channel for receiving a tool 107 therein. The rotary actuator 231 is drivingly connected to the tool wheel 230 to rotate same in 90 degree intervals so that the tool channel 234 indexes between approximately twelve and nine o'clock positions (with respect to FIGS. 18–20). The rotary actuator 231 and wheel 230 are fixed to the exterior surface of cell wall 12 via a bracket 235 (FIG. 12).

Figure 21:
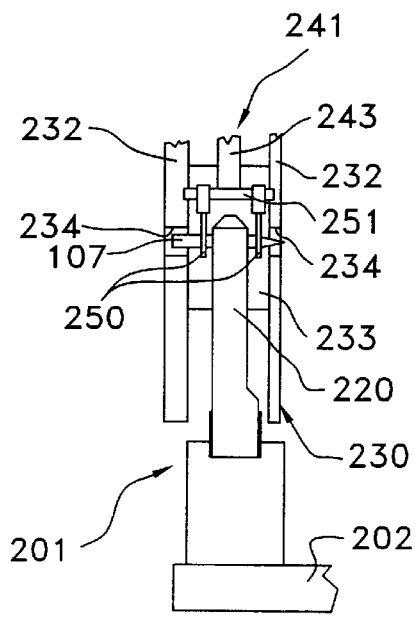
FIG. 21 is an enlarged, fragmentary view of the tool gripper and tool wheel as seen generally along line 21—21 in FIG. 19.

A tool cartridge 236 is provided adjacent and above tool wheel 230 and is mounted to a surface of cell wall 12A by means of a bracket 237 which supports tool cartridge 236 in an inclined or angled manner relative to the horizontal. Tool cartridge 236 is defined by a pair of generally parallel side walls 238 and a tool-supporting bottom wall 239 disposed between side walls 238. The side walls 238 and bottom wall 239 of cartridge 236 together define a generally upwardly opening and elongate U-shaped channel within which a plurality (here approximately 50) of new or fresh tools 107 are stored. The lowermost part or edge of bottom wall 239 of cartridge 236 projects a short distance vertically downwardly between the respective discs 232 of tool wheel 230. The tools 107 are urged downwardly via gravity within the cartridge 236 and each tool 107 has a length which is slightly greater than the distance defined transversely between the inwardly facing surfaces of the respective discs 232 (FIG. 21). As such, as the tools 107 shift downwardly within cartridge 236, the lowermost tool 107 engages the peripheral edges of the respective discs 232 and is stopped thereat until the lowermost tool 107 is aligned with the tool channel 234 of tool wheel 230. Thus, when the tool wheel 230 is rotated so as to position tool channel 234 uppermost and aligned with the lowermost tool 107, the tool 107 will automatically drop into the channel 234 as discussed further below. Further, an electronic proximity sensor 240 is provided along bottom wall 239 to monitor the tool supply within cartridge 236 and to trigger an alarm when the tool supply is low and needs to be replenished.

An additional electronic proximity sensor 240A is provided on wheel 230 adjacent tool channel 234 which monitors the positioning of tool 107 within channel 234 in the event of a jam. Sensor 240A also triggers an alarm if a tool 107 is not present within channel 234 when same is at its uppermost position, which means either that the cartridge 236 has run completely out of new tools 107, or alternatively that the tools 107 are jammed within cartridge 236.

As best shown in FIGS. 18–21, a guide 241 is mounted to the lower side of tool cartridge 236 via a bracket 242 (FIG. 12). Guide 241 is embodied by a generally flat plate-like guide part 243 which is positioned between the respective discs 232 of tool wheel 230. Guide part 243 defines thereon a lower edge 244 which extends along the respective peripheral edges of discs 232 and has an arcuate or concave curvature which is complementary to these convex peripheral edges. The lower end of guide part 243 mounts thereon a pair of torsion springs 250 each projecting generally downwardly in a tangential manner relative to the peripheral convex edges of discs 232. The torsion springs 250 are fixed to an elongate rod (such as a bolt) 251 which is connected to a lower end of guide part 243 via a bracket 252. Torsion springs 250 are horizontally spaced from one another by a distance slightly less than the distance defined transversely between the inwardly facing surfaces of the respective discs 232 as shown in FIG. 21, and serve to prevent a tool 107 positioned within tool channel 234 from falling out of the tool wheel 103 when same is rotated downwardly. The end of guide part 243 opposite torsion springs 250 is fastened to bracket 242.

Figure 14:
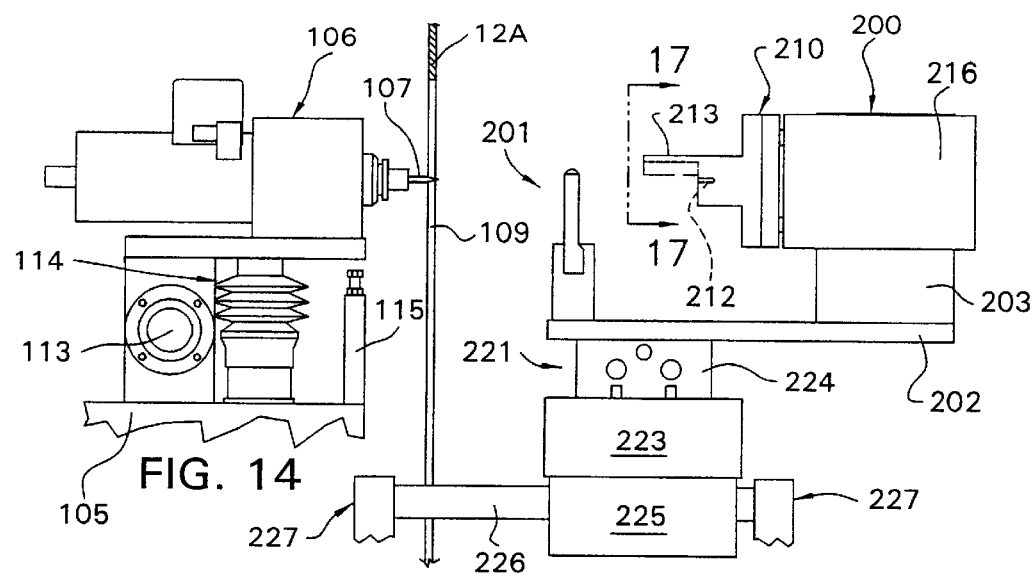
FIG. 14 is an enlarged fragmentary side view of an inactive tool head in position for tool replacement adjacent the tool supply/replacement station.
Figure 15:
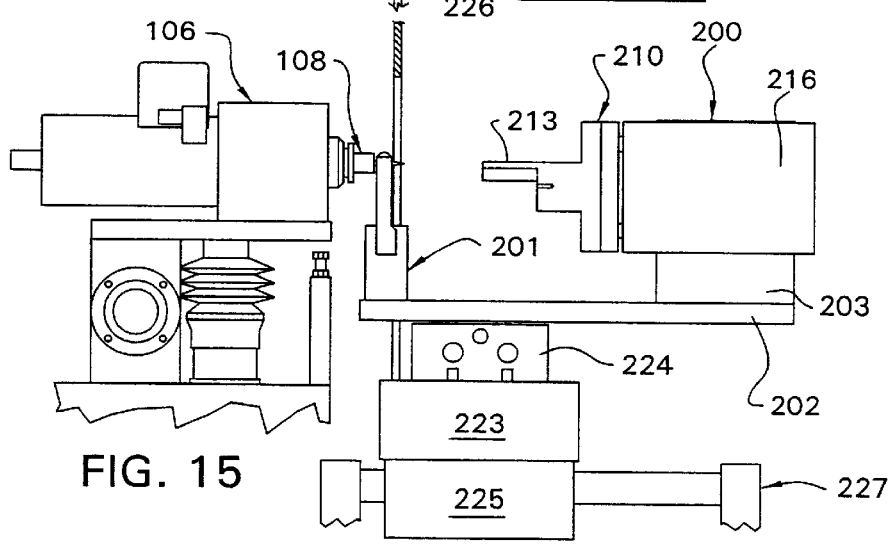
FIG. 15 is a view similar to FIG. 14, but illustrating the tool gripper and gauge in the forwardly extended position for tool removal and replacement.

Reference is now made to FIGS. 14–16 and 18–24 which sequentially illustrate the operation of the tool supply/replacement station 111. As discussed above, if sensors 116 sense breakage or improper positioning of tool 107 within the respective collet 108, or if a tool 107 has processed a number of parts 36 which exceeds a predetermined number, a tool head 106 is rotated into position for tool replacement adjacent wall 12A as discussed above. As shown in FIGS. 14 and 15, the platform 202 which carries tool gauge 200 and gripper 201 is moved via powered slide assembly 225 towards the tool head 106 (or leftwardly in FIGS. 14 and 15) and through the window 109. Once the gripper 201 is in position adjacent tool head 106, the gripper jaws 220 clamp the tool 107 therebetween while the collet 108 essentially simultaneously releases the tool 107. The platform 202 is then moved away from the tool head 106 to the position shown in FIG. 16, and the jaws 220 open to release the broken or otherwise unsatisfactory tool 107 into a discharge chute or receptacle (not shown) located generally beneath gripper 201.

Figure 16:
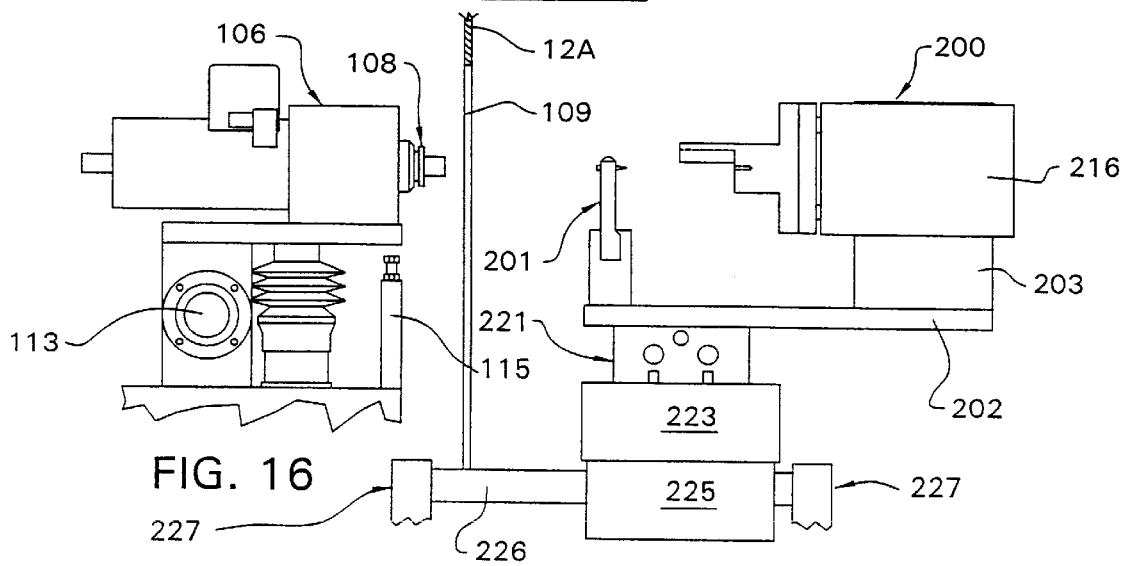
FIG. 16 is a view similar to FIG. 15, but illustrating the tool gripper and gauge in the rearwardly retracted position after removing the tool from the inactive tool head.
Figure 18:
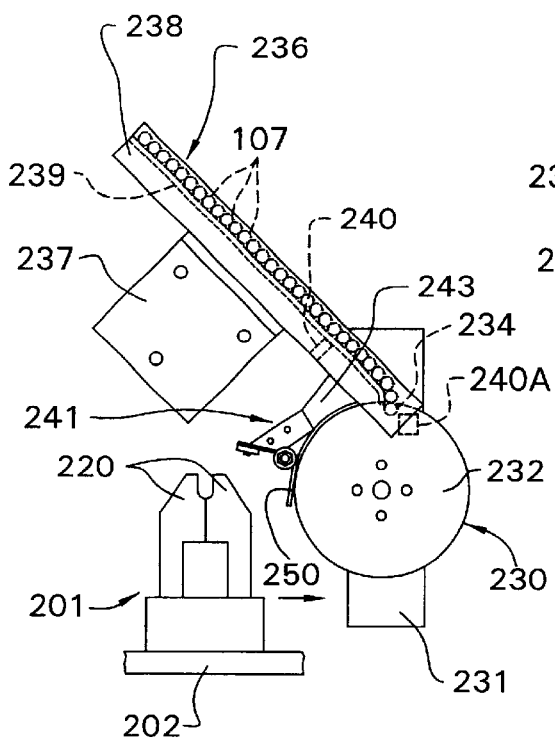
FIG. 18 is an enlarged, fragmentary view of the tool gripper and the tool wheel as seen generally along line 18—18 in FIG. 12.
Figure 19:
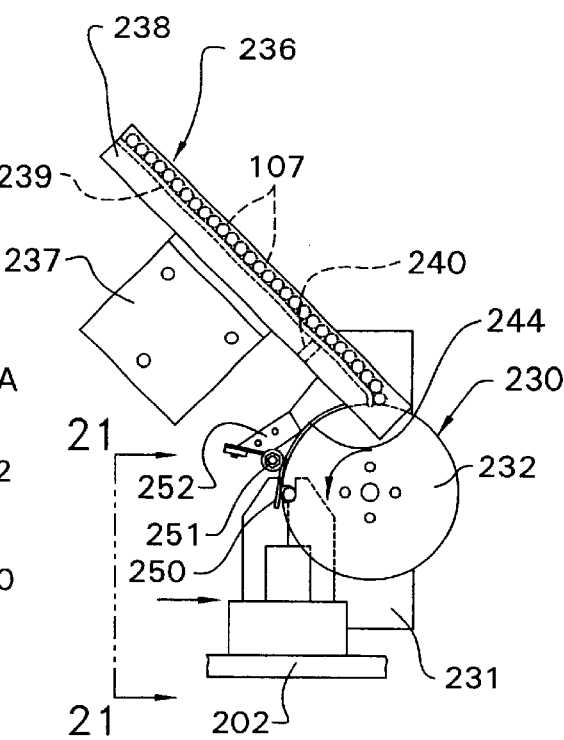
FIG. 19 is a view similar to FIG. 18, but illustrating the tool gripper in the sidewardly extended position for pick-up at the tool wheel.
Figure 20:
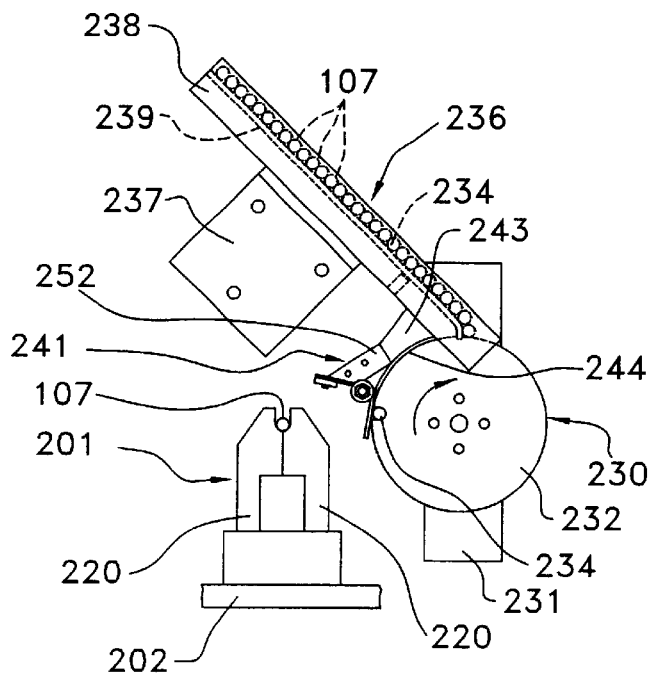
FIG. 20 is a view similar to FIG. 19, but illustrating the tool gripper in the sidewardly retracted position after tool pick-up.

The platform 202 is then moved via slide assembly 221 sidewardly or laterally to move the empty tool gripper 201 (and also the gauge 200) from the position illustrated in FIGS. 16 and 18 towards the tool wheel 230. The tool gripper 201 is of a size which permits same to be inserted at least partially between the respective discs 232 of tool wheel 230 as shown in FIG. 19. When the tool gripper 201 is in position at tool wheel 230 and the jaws 220 thereof are open, the tool wheel 230 is rotated in a counterclockwise direction as indicated by the arrow in FIG. 19 so as to move the tool channel 234 and the tool 107 disposed therein from the twelve o'clock position illustrated in FIG. 18 to the nine o'clock position illustrated in FIG. 19. As the wheel 230 rotates downwardly, the arcuate edge 244 of guide member 241 prevents dislodgement of tool 107 from channel 234, and at the lower segment of the rotation of tool wheel 230 the torsion springs 250 engage the tool 107 and hold same within channel 234. At the end of the rotational movement of tool wheel 230, the tool 107 is effectively positioned between the gripper jaws 220 and same then clamp the tool 107 therebetween. The platform 202 is then moved away from tool wheel 230 (via assembly 221) so as to transport tool gripper 201 (and tool gauge 200) to the position in FIGS. 20 and 22, that is, so that the new tool 107 as gripped by the jaws 220 is coaxially aligned with the empty collet 108 of tool head 106. The torsion springs 250 are thus deflected to the left in FIG. 19 as the gripper 201 moves away from tool wheel 230, and once the tool 107 as clamped by jaws 220 clears the ends of springs 250, the springs 250 deflect rightwardly to their normal downwardly oriented position adjacent the periphery of tool wheel 230. After the gripper 201 picks up the new tool 107, the tool wheel 230 is then rotated in a clockwise direction so as to position tool channel 234 back in the twelve o'clock position which allows the next tool 107 to drop into the tool channel 234 from cartridge 236.

The platform 202 is then moved toward tool head 106 and through window 109 once again so as to position the new tool 107 adjacent collet 108 as shown in FIG. 23. The gauge head 210 is then moved toward the gripper 201 and tool head 106 via cylinder assembly 216 into the extended position shown in FIG. 24. At this juncture, the tapered end of the tool 107 is inserted into the orifice 212 of nose 211 while the jaws 220 of tool gripper 201 simultaneously unclamp the tool 107. The nose 211 engages the tapered end of tool 107 at a set diameter and pushes same into the collet 108 a desired horizontal distance as defined by the front face 214 of nose 211 abutting the front face of collet 108 to effectively mount the tool 107 at the proper depth within collet 108.

Once the new tool 107 is properly mounted within collet 108, the gauge head 210 is retracted from the tool head 106, and the platform 202 moved away from the tool head 106 back to the position illustrated in FIG. 14 so as to be ready for the next tool removal and replacement sequence. With a new tool 107 mounted within collet 108, the tool head 106 is then rotated to the active position when appropriate.

Figure 26:
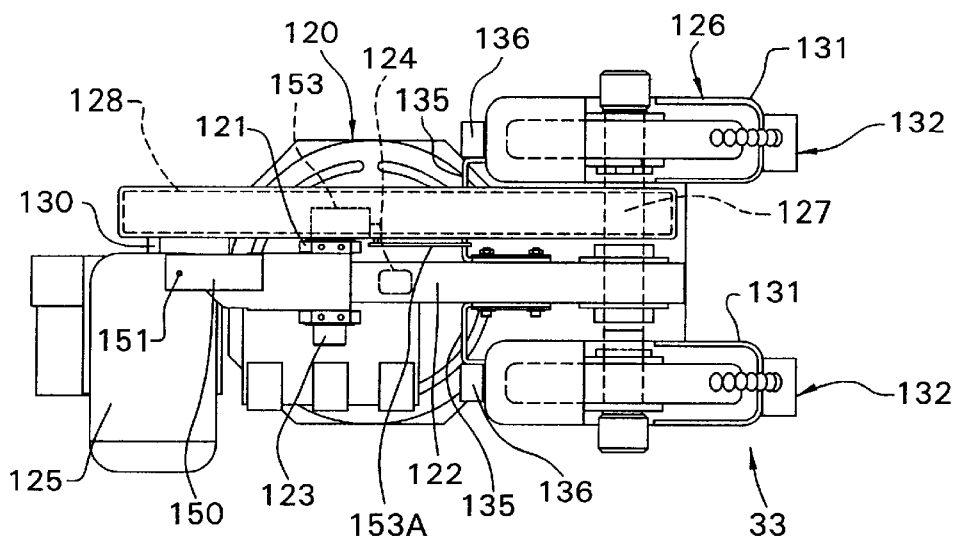
FIG. 26 is a plan view of the brushing station as seen generally along line 26—26 in FIG. 25.
Figure 25:
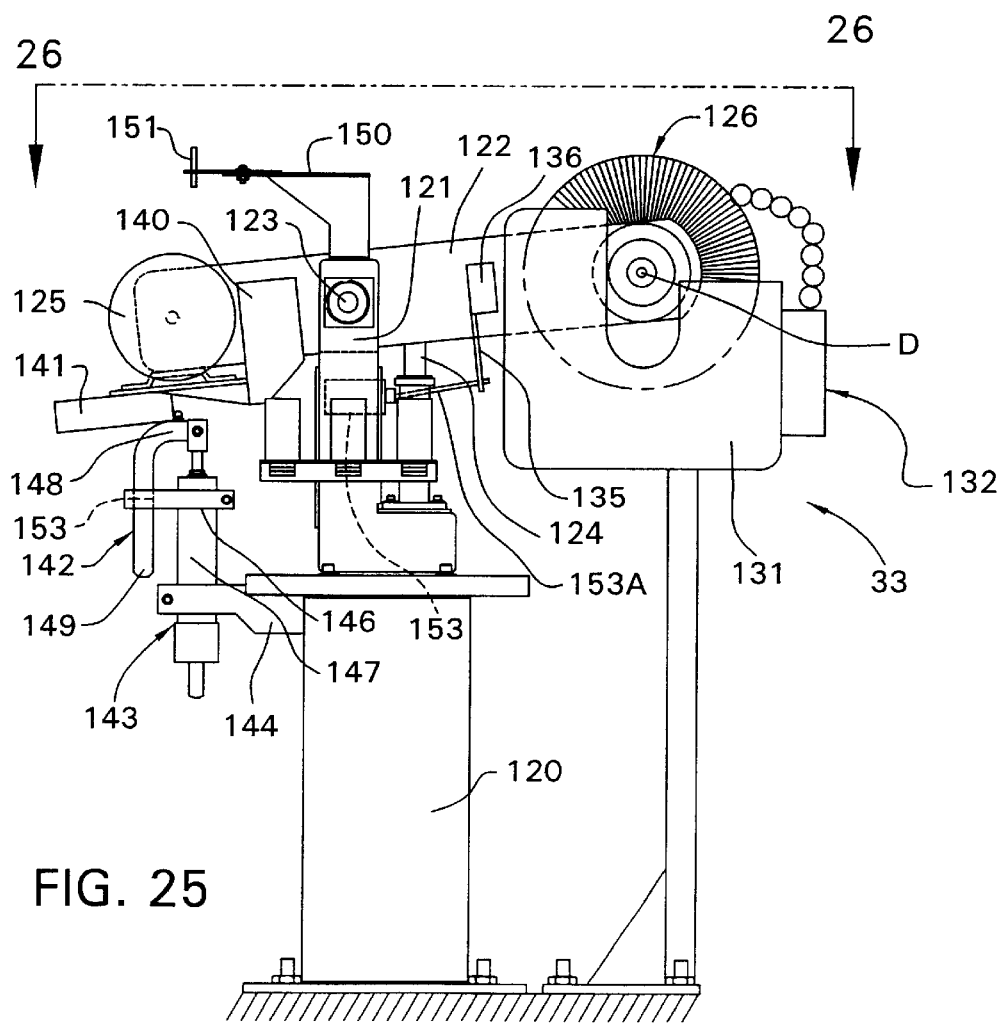
FIG. 25 is an enlarged side elevational view of the brushing station as seen generally along line 25—25 in FIG. 1.

Turning now to brushing station 33, and with reference to FIGS. 25 and 26, same includes a frame or support structure 120 which mounts thereon a clevis 121. A rigid and elongate swing arm 122 is mounted on clevis 121 for pivoting or swinging movement (with respect to FIG. 25) about a horizontal pivot axis 123. Arm 122 is upwardly biased via a biasing cylinder or spring 124 into a desired operating position. An electric motor 125 is mounted at one end of arm 122 for movement therewith about axis 123, and the opposite end of arm 122 mounts thereon a shaft 127 oriented transversely relative thereto. A toothed drive belt 128 extends between and engages a drive shaft 130 (associated with motor 125) and shaft 127 so as transmit the driving force of motor 125 to shaft 127 and rotate same relative to arm 122. Shaft 127, at opposite ends thereof, mounts thereon a pair of disc-like brushes or wheels 126 which rotate with shaft 127 about a common horizontal axis D. In the illustrated embodiment, a hood or cover 131 is associated with each brush 126 and is recessed so that the upper portion of each brush 126 is exposed. An air chiller assembly 132 is provided adjacent each brush 126 for directing chilled or cooled air toward the upper working areas of the respective brushes for cooling same.

In the illustrated embodiment, brush wheels 126 are defined by a plurality of radially-oriented nylon filaments impregnated with silicon carbide, and wheels 126 can each have a diameter of approximately 6 inches to approximately 12 inches.

A pair of support brackets 135 are fixed to the opposite sides of arm 122 and are cantilevered sidewardly therefrom. Brackets 135 each mount thereon an analog distance sensor 136. Each sensor 136 is positioned closely adjacent the periphery of a respective brush 126 and measures the distance to the periphery of brush 126. This measured distance is then compared to a predetermined value so as to measure brush wear as discussed further below.

Motor 125 is mounted to arm 122 via a support bracket 140 to which a stop plate 141 is fastened. Stop plate 141 interacts with a stop member 142 located beneath plate 141. Stop member 142 is adjustable in the vertical direction via a piston-cylinder arrangement 143, the cylinder housing 147 of which is fixedly attached to frame 120 via a generally horizontally extending support arm 144. The upper terminal end of stop member 142 is fastened to the free end of piston 145 for movement therewith in the vertical direction. A guide structure 146 is provided on the cylinder housing for guided vertical movement of stop member 142.

More specifically, as shown in FIG. 25, stop member 142 has an upper portion 148 which is generally horizontally oriented and has a free end which is fixed to piston 145, and a lower generally vertically oriented portion 149 which is joined to upper portion 148 and extends downwardly in a generally perpendicular manner therefrom. Lower portion 149 projects downwardly through a through-hole or opening 153 (shown in dotted lines in FIG. 25) defined vertically within structure 146.

A support arm 150 is mounted at the upper end of clevis 121 and mounts at a free end thereof an additional sensor 151 which is positioned above motor 125. Sensor 151 is an analog distance sensor which measures the vertical displacement of motor 125.

As shown in FIG. 26, a further sensor or limit switch 153 similar to switch 44 of infeed conveyor 41 is mounted on the side of clevis 121 beneath arm 122. Switch 153 has a spring-biased elongate arm 153A which engages a lower part of one of the brackets 135. Once arm 122 has rotated counterclockwise about axis 123 to a predetermined maximum height which corresponds to a maximum rotational movement of switch arm 153A, switch 153 triggers an alarm.

Figure 27:
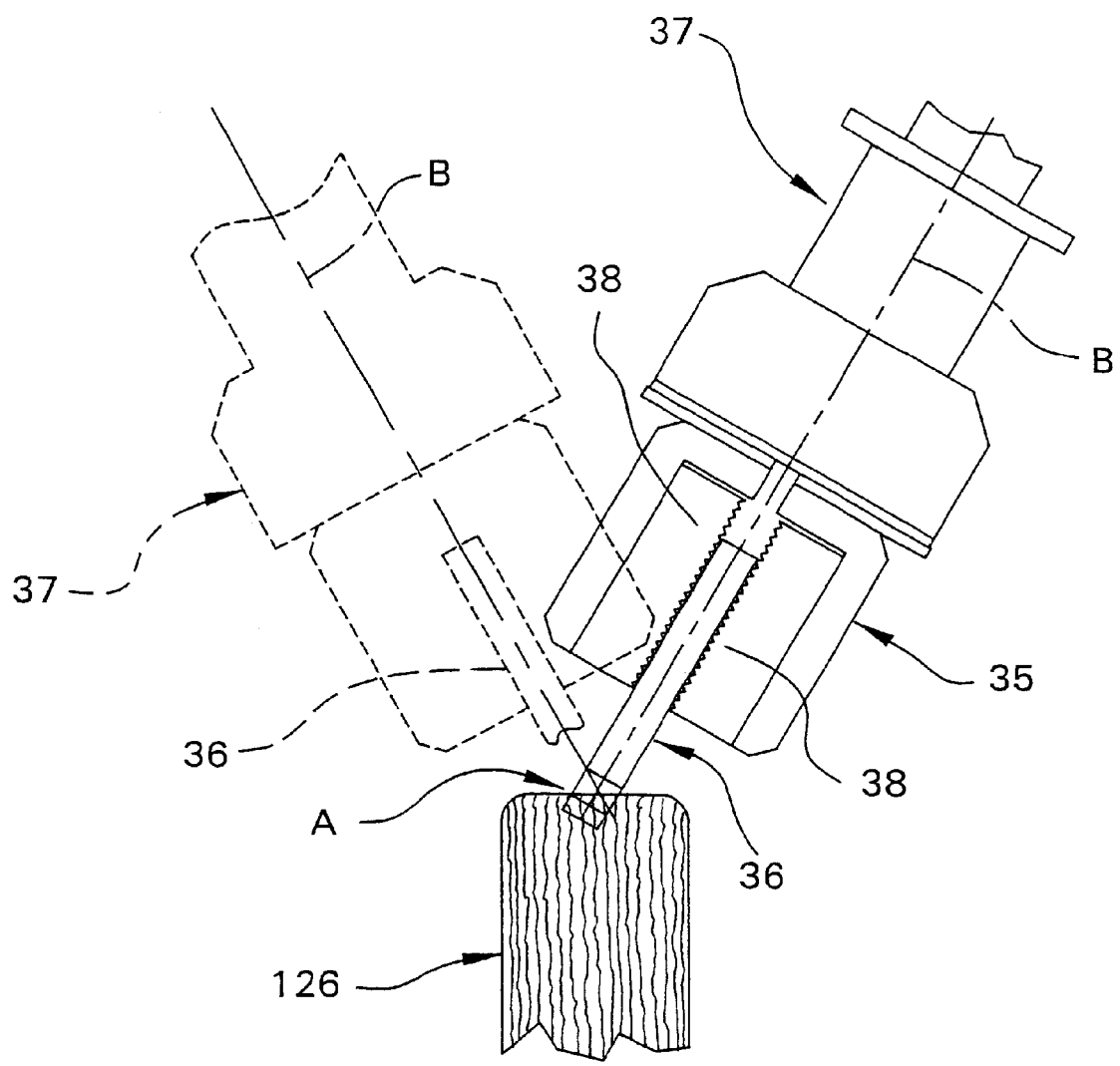
FIG. 27 is an enlarged, fragmentary side view of the robot clamp positioning the part in engagement with a brush wheel.

The robot 34 moves the part 36 into a predefined contact position A as shown in FIG. 27 for buffing of the root 40 thereof subsequent to the deburring operation at station 32 as discussed above. In the illustrated embodiment, the part 36 is positioned at an appropriate angle relative to the horizontal so that the root 40 thereof is brushed at an angle by one of the brush wheels 126 to effectively radius the chamfered edges of root 40. In addition, the top and sides of root 40 may also be deburred by brush wheel 126. The gripper or jaws 35 of the robot are rotated about the axis B 360 degrees (one or more times) so as to brush all chamfered edges of the root 40. The robot gripper 35, if desirable or necessary, may then be moved so that the rotational axis B thereof is oriented generally as illustrated in dotted lines in FIG. 27, and the part 36 again rotated about axis B (one or more times) so as to improve the quality of the rounded corners of root 40.

When one buffing brush or wheel 126 has become sufficiently worn, then the other brush 126 is utilized until it becomes worn, at which time shutdown occurs and both brushes 126 are replaced. As the active brush 126 wears, and hence decreases in radius, the respective sensor 136 continuously measures the ever-increasing distance to the periphery of the active brush 126 and emits a signal so as to lower stop member 142 which effectively raises the brush 126 (by pivoting arm 122 counterclockwise about fulcrum 123) so that contact point A remains the same. At the same time, the sensor 136 signals the motor control to step up the speed of the motor 125 so as to maintain constant peripheral brush speed (which necessarily decreases as the radius of the brush decreases). As the stop member 142 is lowered by sensor 136, the sensor 151 measures the vertical distance to the motor 125 (as same is being lowered) to control the amount of vertical adjustment of stop member 142. Once the stop member 142 is lowered the appropriate amount to maintain contact point A at the desired height, then the sensor 151 emits a signal so as to stop further movement of the stop member 142.

Further, the switch 153 continuously monitors the movement of arm 122 as adjusted by the respective sensor 136. Once arm 122 rotates about axis 123 a predetermined angular amount and thus raises the active brush wheel 126 to a maximum vertical height, switch 153 triggers an alarm or warning indicating that the active brush wheel 126 is worn. At this juncture, the other brush wheel 126 may be utilized, or the worn brush wheel 126 is replaced.

Sensor 153 also serves to check the operation of sensor 151 so that in the event that sensor 151 malfunctions and thus permits unrestricted raising of the active brush wheel 126, the sensor 153 will trigger a warning of such malfunction upon the active brush 126 reaching the upper maximum limit.

After the part 36 has been adequately brushed, the robot 34 transfers the finished part 36 to the discharge conveyor 52 at the infeed/outfeed conveyor station 30.

The operation of the infeed and outfeed conveyors, the part orienter station 31, the deburring station 32 (including the tool supply and replacement station 111) the brushing station 33, and the movement of the robot 34 is controlled by a logic type controller and by software which controls all of the functioning of the above systems so that an essentially entirely automated operation is achieved. An operator simply has to periodically replenish the supply of parts 36 to the supply conveyor 41, the supply of tools 107 to the tool cartridge 236, and also replace the two brush wheels 126 when worn. The control system also includes a touch-sensitive display screen incorporated into control unit 23 which provides the operator with significant ability to control and monitor the various operations.

Figure 28:
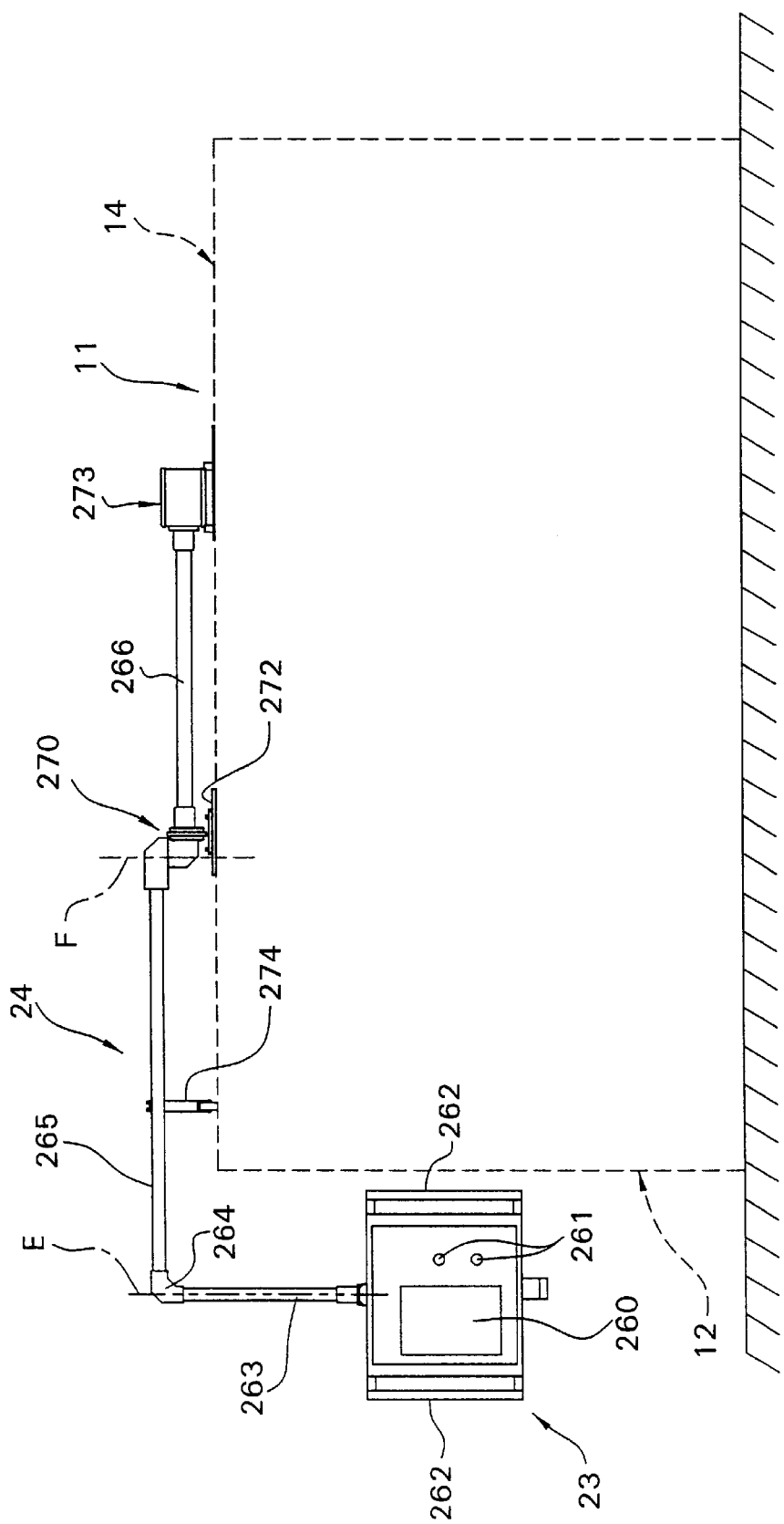
FIG. 28 is a side view of the control unit and the mounting thereof on the top wall of the cell.

As shown in FIGS. 1 and 28, control unit 23 includes an interactive, and preferably touch sensitive, display panel 260, various push-button controls 261 and a pair of sidewardly projecting handles 262. Control unit 23 is mounted on top wall 14 of cell 12 by means of elongate arm assembly 24. More specifically, arm assembly 24 includes a vertically oriented and elongate and rigid tube or conduit 263 which at its lower end is pivotally attached to the upper surface of a housing of control unit 23 to allow rotation of control unit 23 about vertical axis E into various angular positions (shown in dotted lines in FIG. 1). The upper end of tube 263 is connected via an elbow 264 to one end of a horizontally oriented tube part 265. The opposite end of tube part 265 is pivotally fastened to a further stationary rear tube part 266 by means of a rotatable joint 270. Joint 270 is supported on top cell wall 14 by a mounting plate 272. The opposite end of rear tube part 266 is supported at a housing structure 273 fixed to top wall 14. The end of tube part 265 adjacent elbow 264 is spaced upwardly from top wall 14 by means of a caster 274 which rollingly engages the upper surface of top wall 14 along the outer edge thereof.

The tube parts 263, 265 and 266, as well as elbow 264 and joint 270 are hollow and house power and communication cabling (not shown) therein.

The above arm assembly 24 as described above permits swinging movement of control unit 23 and tube parts 263 and 265 about a vertical pivot axis F defined at joint 270. As shown in FIG. 1, control unit 23 is swingably movable along side wall 12 of cell 11 to various positions as shown in dotted lines in FIG. 1 for convenience in use. As shown in FIG. 1, the front upright side wall of the cell, in the illustrated embodiment, has a substantially semi-circular configuration which is also preferably generated about the axis F.

The overall operation of the cell 11 and stations discussed above will now be briefly described.

Parts or work pieces 36 to be processed are loaded onto the end of supply conveyor 41, either manually or by a loading apparatus, preferably so that the root 40 thereof is oriented outwardly or away from cell wall 12 and so that the parts 36 are positioned lengthwise along belt 43 (i.e. so that the longitudinal sides of package 39 are generally parallel to side walls 42 of conveyor 41). The guide member 51 of conveyor 41 guides or funnels the individual parts 36 toward stop pin 56 which serves to separate the individual parts 36 from one another for feeding into part orienter station 31, and station 31 checks the orientation and type of part 36 and the part 36 is either rejected or cleared for pick-up by the robot 34.

The part 36 is then advanced toward deburring station 32 by robot 34, and prior to moving the part 36 into position for cutting at tool 107 of the active tool head 106, the condition and orientation of the active tool 107 is checked via sensors 116. If the active tool 107 is in an unsatisfactory condition, then the active head 106 is rotated and the tool 107 is removed and replaced via the tool supply/replacement device 111 as discussed above. If the active tool 107 is satisfactory as determined by sensors 116, then the part 36 is deburred at station 32. After deburring a part 36, the active tool 107 is again checked by sensors 116, and if the tool 107 is in an unsatisfactory condition, then the unsatisfactory tool 107 is replaced, the part 36 just processed is rejected and transported to discharge conveyor 100, and the robot 34 thereafter picks up a new part 36 at station 31.

After deburring, the robot 34 transports the part to brushing station 33 and positions the part in contact with the abrasive bristles of an active brush wheel 126 to radius or finish the chamfered edges of the part root 40, and also rotates the part 36 about axis B to finish all edges of root 40, as discussed above. The outer periphery of the active brush wheel 126 is continuously monitored by the respective sensor 136 for wear, and the brush wheel 126 is raised to maintain a substantially constant contact point A, and the brush speed is adjusted to maintain a constant peripheral speed at the contact point. After brushing the part 36 for a predetermined amount of time, the part 36 is then transported to the discharge conveyor 54. Once a predetermined number of parts 36 have accumulated on belt 54, an alarm is triggered by sensor 59 so that the finished parts 36 can be removed from conveyor 54.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An automated process for deburring edges of a root of a turbine blade, comprising:
  providing individual packages each containing a turbine blade body enclosed within a block-like capsule of protective material with the root of the turbine blade projecting outwardly of the block-like capsule;
  providing a machining cell having upright walls joined to a top wall and defining therein a closed interior room;
  providing a package supply system exteriorly of said machining cell with a discharge end of the supply system projecting through the upright wall of the cell for communication with the room;

providing a package receiving and orienting station within said room adjacent the discharge end of said supply system;

providing a machining station within said room in sidewardly spaced relation from said receiving and orienting station, the machining station including a machine head with a rotating tool;

providing a brushing station within said room in sidewardly spaced relation from said machining station;

providing a package discharge system having an inlet within said room with said discharge system projecting outwardly through the upright wall for discharge exteriorly of the cell;

providing a multi-axis robot within said room with said robot having a movable arm provided with relatively movable opposed grippers associated therewith for gripping a said package, said robot being positioned so that said robot arm can move a said package between any of said stations;

providing a plurality of packages to said supply system exteriorly of said room and then moving the packages sequentially toward the discharge end thereof;

sequentially and intermittently discharging packages from the discharge end of said supply system to said receiving and orienting station;

sensing the package at the orienting station to determine (1) if the proper package has been supplied to the station and (2) if the package is properly oriented at the station;

discharging the package from the receiving and orienting station into a reject station if one of the sensed conditions provides a signal which indicates either an improper package or an improper orientation thereof;

moving the robot arm into gripping engagement with the package at the receiving station and thereafter moving the robot arm and the package gripped thereby to the machining station;

sensing the condition of the rotating tool at the machining station, prior to moving the package into engagement with the tool, to sense whether the tool is broken or unacceptably worn;

upon sensing an unacceptable tool at the machining station, then rotating the machine head from a machining position into a tool-changing position wherein the tool is disposed adjacent and accessible through an access opening in the upright wall to permit removal of the old tool and insertion of a new tool;

upon sensing an acceptable tool, then moving the robot arm and the package gripped thereby such that the package is moved into contact with the rotating tool, and thereafter moving the package through a path such that the edges extending peripherally around the root are successively engaged with the rotating tool so as to effect deburring of the edges;

then moving the robot arm and package away from the rotating tool;

then again sensing the condition of the rotating tool to determine if it is still acceptable;

if the tool as sensed in the last-mentioned sensing step is not acceptable, then moving the machining head to the tool-changing position and effecting changing of the tool, and also moving the robot arm to a reject station and discharging the package at the reject station;

if the tool as sensed by said last-mentioned sensing step is acceptable, then continuing the movement of the robot arm to the brushing station and moving the gripped package into contact with a rotating brush at a predefined spacial contact point which is defined adjacent the periphery of the rotating brush;

thereafter rotating the robot arm and the package gripped thereby so that the root where it engages the brush at the spacial contact point is progressively rotatably moved through the contact point so that the surrounding peripheral edge of the root is contacted by the bristles of the brush to effect rounding thereof;

thereafter rotating the robot arm and the package gripped thereby to a discharge station and discharging the package onto the inlet end of the discharge system; and then moving the package along the discharge system outwardly through the upright wall of the cell.

2. The process according to claim 1, including the steps of:

maintaining a substantially constant bias against the machine head in a direction substantially transverse to the rotational axis of the tool so as to maintain the tool in a predefined position when the rotating tool is free of contact with the package; and engaging the package against a side of the tool which is opposite the direction of the bias so that the constant bias continually maintains the tool in engagement with and tracking along the edge of the root during the deburring of the root.

3. The process according to claim 1, including the steps of:

sensing radial wear of the brush bristles associated with the rotating brush at the brushing station, and automatically adjusting the position of the brush so that the periphery of the rotating brush bristles continue to pass through the predefined spacial contact point; and adjusting the rotational speed of the brush in response to sensing the positional adjusting movement thereof so that the peripheral velocity of the bristles passing through the predefined spacial contact point remains constant even as the center of rotation of the brush is moved radially closer to the spacial contact point.

4. An automated method for processing a turbine blade, said method comprising the steps of:

providing a plurality of parts each including a turbine blade and a root portion projecting outwardly therefrom;

transporting a part to a part-receiving station;

inspecting the part, without human intervention, at the part-receiving station to determine whether the part is properly oriented for processing;

if the part is properly oriented, then transporting the part to a machining station located within an enclosed area, without human intervention, and machining the root portion of the part to remove excess material therefrom so as to create a chamfer along edges of the root portion; and discharging the part from the enclosed area.

5. The method of claim 4 further including the step of buffing the chamfered edges of the root portion of the part after said step of machining to blend the chamfered edges with the surrounding areas of the root portion.

6. The method of claim 4 further including transporting the part, without human intervention, to a buffing station located within the enclosed area subsequent to said step of machining, and buffing the chamfered edges of the root portion of the part to round same.

7. The method of claim 4 wherein said step of inspecting includes determining whether the part is the proper part and also whether the part is properly oriented.

8. An automated process for deburring edges of a root of a turbine blade, comprising:

providing individual packages each containing a turbine blade body enclosed within a block-like capsule of protective material with the root of the turbine blade projecting outwardly of the block-like capsule;

providing a machining cell having upright walls joined to a top wall and defining therein a substantially closed interior room;

providing a package supply system exteriorly of said machining cell with a discharge end of the supply system projecting through an upright wall of the cell for communication with the room;

providing a package receiving station within said room adjacent the discharge end of said supply system;

providing a machining station within said room, the machining station including a machine head with a rotating tool;

providing a brushing station within said room;

providing a package discharge system having an inlet within said room with said discharge system projecting outwardly through an upright wall for discharge exteriorly of the cell;

providing a multi-axis robot within said room with said robot having a movable arm provided with relatively movable opposed grippers associated therewith for gripping a said package;

providing a plurality of packages to said supply system exteriorly of said room and then moving the packages sequentially toward the discharge end of the supply system;

sequentially and intermittently discharging packages from the discharge end of said supply system to said receiving station;

sensing the package at the receiving station to determine (1) if the proper package has been supplied to the receiving station and (2) if the package is properly oriented at the receiving station;

discharging the package from the receiving station into a reject station if one of the sensed conditions provides a signal which indicates either an improper package or an improper orientation thereof;

moving the robot arm into gripping engagement with the package at the receiving station and thereafter moving the robot arm and the package gripped thereby to the machining station;

moving the robot arm and the package gripped thereby such that the package is moved into contact with the rotating tool at the machining station, and thereafter moving the package through a path such that the edges extending peripherally around the root are successively engaged with the rotating tool so as to effect deburring of the edges;

moving the robot arm and the package gripped thereby to the brushing station;

thereafter moving the robot arm the package gripped thereby such that the package is moved into contact with a brush arrangement so that the surrounding peripheral edge of the root is contacted by the bristles of the brush arrangement to effect rounding thereof;

thereafter moving the robot arm and the package gripped thereby to a discharge station and discharging the package onto the inlet end of the discharge system; and then moving the package along the discharge system outwardly through the upright wall of the cell.

9. An automated method of processing a turbine blade part, said method comprising:

supplying a part to a sensing location;

sensing the properties of the part at the sensing location, without manual sensing or manipulation, to determine at least one of: whether the correct part has been supplied and whether the part is properly oriented;

transporting the part, without manual intervention, to a first station within a substantially enclosed cell and cutting the part at the first station to remove excess material therefrom;

transporting the part, without manual intervention, to a second station within the enclosed cell and polishing the part at the second station; and discharging the finished part from the enclosed cell.

10. The method of claim 9 wherein the turbine blade part includes a turbine blade body and a root projecting outwardly therefrom, said step of cutting includes moving the part, without manual intervention, into contact with a rotating cutting tool to create a pre-break along respective edges of the root, and said step of polishing is performed after said step of cutting and includes moving the part, without manual intervention, into contact with a buffing device to blend the respective edges of the root into the surrounding areas thereof.

11. The method of claim 10 wherein the turbine blade part is transported to the first and second stations by a robot located within the enclosed cell.

12. The method of claim 9 wherein the sensing location is located at and forms part of a part-receiving station located within the enclosed cell, and said step of supplying includes sequentially supplying a plurality of parts, one at a time, to the part-receiving station on a conveyor unit having a downstream end which projects partially into the enclosed cell.

13. The method of claim 12 wherein the turbine blade part includes a turbine blade body and a root projecting outwardly therefrom, said step of cutting includes moving the part, without manual intervention, into contact with a rotating cutting tool to create a pre-break along respective edges of the root, and said step of polishing is performed after said step of cutting and includes moving the part, without manual intervention, into contact with a brush to round the respective edges of the root.

14. The method of claim 13 wherein the turbine blade part is transported from the part-receiving station to the first station, and from the first station to the second station by a robot located within the enclosed cell and provided with relatively movable opposed grippers for gripping the part.

15. The method of claim 9 wherein said step of sensing includes sensing the physical properties of the part to determine both whether the part is properly oriented and whether the correct part has been supplied, and said method further includes rejecting the part if an improperly oriented part is present or if an incorrect part has been supplied.

16. An automated process for finishing edges of a root of a turbine blade, said process comprising:

providing a plurality of individual parts each containing a turbine blade body and a root projecting outwardly therefrom;

performing the following steps (A) through (F) without manual intervention:

(A) sensing an individual part to determine at least one of (1) if the proper part is present and (2) if the part is properly oriented;
(B) rejecting the part if an improper part is present or the part is improperly oriented;
(C) transporting the part to a cutting station;
(D) moving the part into contact with a cutting tool at the cutting station so as to create a chamfer along the respective edges of the root;
(E) transporting the part to a brushing station; and
(F) moving the part into contact with a brush located at the brushing station to round the chamfered edges of the root.

17. The process of claim 16 wherein at least said steps (C), (D), (E) and (F) are performed within an enclosed cell defined by upright walls which are joined to a top wall.

18. The process of claim 16 including feeding the parts, one at a time, to a part-receiving station at which said step (A) is performed.

19. The process of claim 16 wherein once the cutting tool has processed a predetermined number of parts, then replacing the cutting tool with a new cutting tool.

20. The process of claim 16 wherein the turbine blade body of each part is enclosed within a block-like capsule and the respective root is cantilevered outwardly from the capsule, and said step of sensing includes sensing both the physical properties of the capsule and the orientation of the root.

21. The process of claim 16 including transporting the part to a discharge area after performing said step (F).

22. The process of claim 16 wherein said steps (C), (D), (E) and (F) are performed by a robot including a pair of opposed and movable jaws which grippingly engage the part being processed.

23. The process of claim 22 wherein the turbine blade body of each part is enclosed within a protective block-like package so that the respective root projects outwardly from the block-like package, and the robot performs said steps (C), (D), (E) and (F) by grippingly engaging the block-like package of the respective part.

24. The process according to claim 8, including the steps of:
   maintaining a substantially constant bias against the machine head in a direction substantially transverse to the rotational axis of the tool so as to maintain the tool in a predefined position when the rotating tool is free of contact with the package; and
   engaging the package against a side of the tool which is opposite the direction of the bias so that the constant bias continually maintains the tool in engagement with and tracking along the edge of the root during the deburring of the root.

25. The process according to claim 24, wherein upon sensing that the rotating tool of the machine head has processed a predetermined number of packages, then rotating the machine head from a machining position to a tool-changing position wherein the tool is accessible through an access opening in an upright wall of the cell, removing the old tool and inserting a new tool, and then rotating the machine head from the tool-changing position to the machining position for processing of the next package.

26. The process according to claim 8 including providing a control arrangement for controlling movements of the robot and operations performed at the package supply system, the package receiving station, the machining station, the brushing station and the package discharge system.

* * * * *